United States Patent
Learmonth et al.

(10) Patent No.: US 12,079,315 B2
(45) Date of Patent: Sep. 3, 2024

(54) SYSTEM AND METHOD FOR IDENTITY CREATION AND ASSERTION

(71) Applicant: HID Global CID SAS, Suresnes (FR)

(72) Inventors: Darren Learmonth, Austin, TX (US); Joseph Bernard Pearson, Cedar Park, TX (US)

(73) Assignee: HID Global CID SAS, Suresnes (FR)

( * ) Notice: Subject to any disclaimer, the term of this patent is extended or adjusted under 35 U.S.C. 154(b) by 403 days.

(21) Appl. No.: 17/309,460

(22) PCT Filed: Nov. 27, 2019

(86) PCT No.: PCT/EP2019/082676
§ 371 (c)(1),
(2) Date: May 28, 2021

(87) PCT Pub. No.: WO2020/109359
PCT Pub. Date: Jun. 4, 2020

(65) Prior Publication Data
US 2021/0374216 A1 Dec. 2, 2021

Related U.S. Application Data

(60) Provisional application No. 62/773,012, filed on Nov. 29, 2018.

(51) Int. Cl.
| G06F 21/30 | (2013.01) |
| G06F 21/00 | (2013.01) |
| G06F 21/31 | (2013.01) |
| G06F 21/45 | (2013.01) |

(Continued)

(52) U.S. Cl.
CPC .............. *G06F 21/30* (2013.01); *G06F 21/31* (2013.01); *G06F 21/45* (2013.01); *G06F 21/64* (2013.01); *H04W 4/70* (2018.02)

(58) Field of Classification Search
CPC .......... G06F 21/31; G06F 21/45; G06F 21/30; G06F 21/34; G06F 21/36; G06F 21/64; G06F 21/62; G06F 21/6245; G06F 21/6254
See application file for complete search history.

(56) References Cited

U.S. PATENT DOCUMENTS

| 2017/0324750 A1* | 11/2017 | Khan ................ H04W 12/068 |
| 2018/0165781 A1* | 6/2018 | Rodriguez ......... G06Q 20/3821 |

(Continued)

FOREIGN PATENT DOCUMENTS

| WO | WO-2018089098 A1 | 5/2018 |
| WO | WO-2018143983 A1 | 8/2018 |
| WO | WO-2020109359 A1 | 6/2020 |

OTHER PUBLICATIONS

"International Application Serial No. PCT/EP2019/082676, International Search Report mailed Feb. 6, 2020", 5 pgs.

(Continued)

*Primary Examiner* — Edward Zee
(74) *Attorney, Agent, or Firm* — Schwegman Lundberg & Woessner, P.A.

(57) ABSTRACT

A system is disclosed that includes an identity server that is configured to build, manage, augment, and assert a user's identity. The identity server may also be configured to manage attestations for the user's identity.

20 Claims, 20 Drawing Sheets

(51) Int. Cl.
    *G06F 21/64*     (2013.01)
    *H04W 4/70*     (2018.01)

(56) References Cited

U.S. PATENT DOCUMENTS

2018/0227130 A1*   8/2018   Ebrahimi .............. H04L 9/3247
2020/0007316 A1    1/2020   Krishnamacharya et al.

OTHER PUBLICATIONS

"International Application Serial No. PCT/EP2019/082676, Written Opinion mailed Feb. 6, 2020", 6 pgs.
"International Application Serial No. PCT EP2019 082676, International Preliminary Report on Patentability mailed Jun. 10, 2021", 8 pgs.
"Canadian Application Serial No. 3,121,338, Examiners Rule 86(2) Report mailed Jan. 31, 2024", 4 pgs.
"European Application Serial No. 19812954.6, Communication Pursuant to Article 94(3) EPC mailed Jun. 25, 2024", 5 pages.

* cited by examiner

SYSTEM AND METHOD FOR IDENTITY CREATION AND ASSERTION

CROSS-REFERENCE TO RELATED APPLICATION(S)

This application is a national stage application under 35 U.S.C. § 371 of PCT Appl. No. PCT/EP2019/082676, titled "System and Method for Identity Creation and Assertion," filed Nov. 27, 2019, which claims priority to U.S. Prov. Pat. Appl. No. 62/773,012, titled "System and Method for Identity Creation and Assertion," filed Nov. 29, 2018, each of which is hereby incorporated by reference herein in its entirety.

FIELD OF THE DISCLOSURE

Embodiments of the present disclosure relate to communication systems and, more specifically, to various systems and methods of communicating identity information between network nodes.

BACKGROUND

Assertions of identity are particularly difficult in an electronic-based communication system. Even when an assertion of ones identity is desirable for establishing a level of trust with another entity, there are significant difficulties associated with sharing identity information across an untrusted communication network with a possibly untrusted entity. And then, even when an identity is shared, there are still issues associated with determining whether the source of the identity information is valid.

SUMMARY

It is with respect to the above that embodiments of the present disclosure were contemplated. In particular, embodiments of the present disclosure contemplate various systems and methods. One non-limiting example of a system includes an identity server having a processor, a communication interface coupled with the processor and facilitating machine-to-machine communications, and a computer-readable storage medium coupled with the processor. The computer-readable storage medium has or stores instructions that, when executed by the processor, enable the processor to: i) receive information from an identity document that is asserted to prove an identity of an entity, ii) verify a format of the identity document matches, within a predetermined statistical probability, an expected format of the identity document, iii) in response to verifying the format of the identity document matches the expected format of the identity document, extract at least some information from the identity document, iv) build an electronic record that represents an identity of the entity, wherein the electronic record includes the extracted information, and v) store the electronic record that represents the identity of the entity in a database, wherein the electronic record that represents the identity of the entity is stored in the database in such a way as to enable the entity to assert information from the electronic record to an untrusted entity for verification of the identity of the entity.

In some embodiments, instructions further enable the processor to determine that an additional identity document is required to build the electronic record that represents the identity of the entity and provide a request to the entity for an additional identity document. In some embodiments, the instructions further enable the processor to: i) receive information from the additional identity document that is asserted to further prove the identity of the entity, ii) verify a format of the additional identity document matches, within the predetermined statistical probability, an expected format of the additional identity document, iii) in response to verifying the format of the additional identity document matches the expected format of the additional identity document, extract at least some information from the additional identity document, and iv) include the extracted information from the additional identity document into the electronic record that represents the identity of the entity in the database. In some embodiments, the instructions further enable the processor to determine that a minimum number of identity documents have not been received and condition the building and storing of the electronic record that represents the identity of the entity in the database upon the entity providing a number of identity documents that meet the minimum number of identity documents.

In some embodiments, the database corresponds to a distributed database and the electronic record is stored as an entry in a distributed ledger. In some embodiments, the electronic record includes at least one validation signature and at least one reference to another entry in the distributed ledger.

In some embodiments, the instructions further enable the processor to: i) receive a request for identity verification of the entity, ii) determine, from the request, that at least some information from the electronic record will be shared with the untrusted entity as part of the untrusted entity verifying the identity of the entity, iii) reference the database to retrieve the at least some information from the electronic record that will be shared with the untrusted entity, and iv) transmit an electronic message over a communication network to a device operated by the untrusted entity, wherein the electronic message contains the information retrieved from the electronic record. In some embodiments, the instructions further enable the processor to receive a request for an attestation of information stored in the electronic record, receive an attestation for the information stored in the electronic record, and store the attestation as part of or with reference to the electronic record, thereby causing the attestation to become part of the identity of the entity in the database.

In some embodiments, the entity is an individual person. In some embodiments, the entity is an organization. In some embodiments, the identity document is a government-issued physical document and/or a government-issued electronic document. In some embodiments, the format of the identity document is verified by scanning the identity document for a security feature. In some embodiments, the extracted information includes a photograph of the entity and textual content that describes the entity. In some embodiments, the textual content includes a name of the entity and a date of birth of the entity.

In another embodiment, a method is provided that includes: i) receiving information from an identity document that is asserted to prove an identity of an entity, ii) verifying a format of the identity document matches, within a predetermined statistical probability, an expected format of the identity document, iii) in response to verifying the format of the identity document matches the expected format of the identity document, extracting at least some information from the identity document, iv) building an electronic record that represents an identity of the entity, wherein the electronic record includes the extracted information, and v) storing the electronic record that represents the identity of the entity in a database, wherein the electronic record that represents the identity of the entity is stored in the database in such a way as to enable the entity to assert information from the electronic record to an untrusted entity for verification of the identity of the entity. In some embodiments, the method further includes: i) determining that an additional identity document is required to build the electronic record that represents the identity of the entity, ii) providing a request to the entity for an additional identity document, iii) receiving information from the additional identity document that is asserted to further prove the identity of the entity, iv) verifying a format of the additional identity document matches, within the predetermined statistical probability, an expected format of the additional identity document, v) in response to verifying the format of the additional identity document matches the expected format of the additional identity document, extracting at least some information from the additional identity document, and vi) including the extracted information from the additional identity document into the electronic record that represents the identity of the entity in the database. In some embodiments, the additional identity document is a physical document and the identity document includes an electronic document.

BRIEF DESCRIPTION OF THE DRAWINGS

The present disclosure is described in conjunction with the appended figures, which are not necessarily drawn to scale.

DETAILED DESCRIPTION

Figure 1:
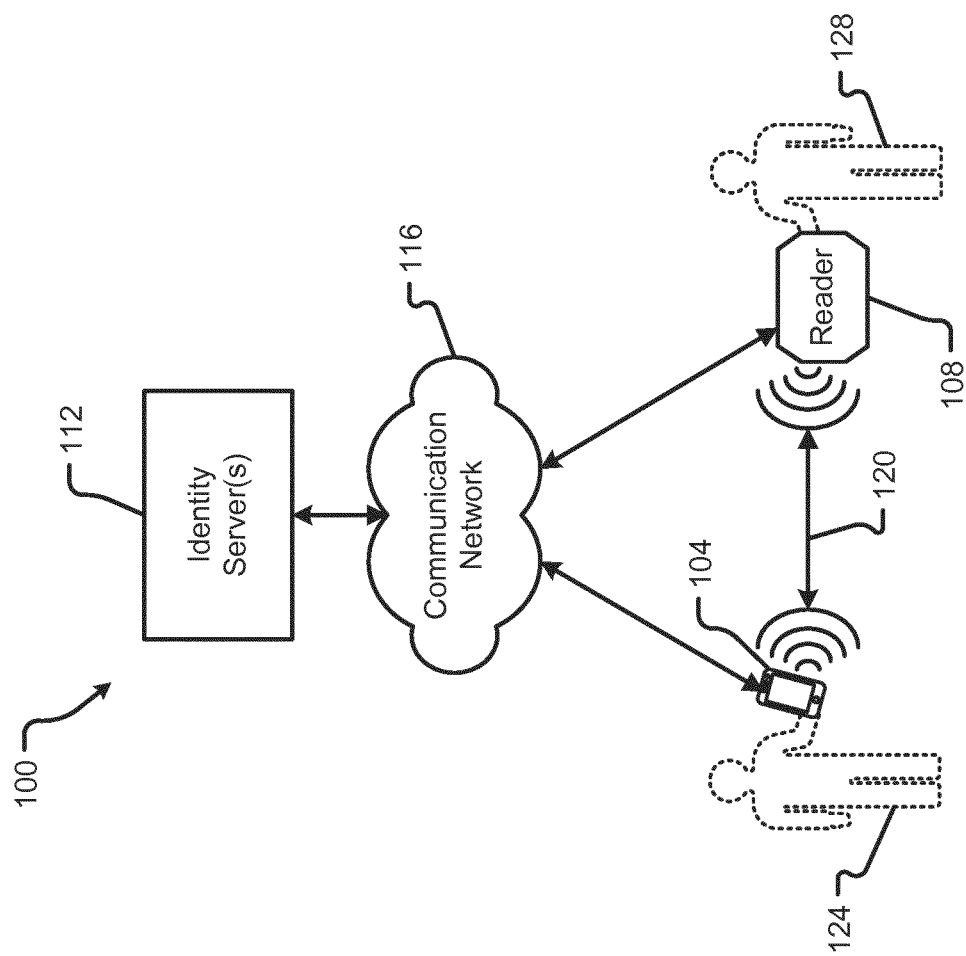
FIG. 1 is a block diagram depicting a system in accordance with at least some embodiments of the present disclosure.

With reference to FIG. 1, an illustrative communication system 100 will be described in accordance with at least some embodiments of the present disclosure. The system 100, in some embodiments, includes a mobile communication device 104, a reader 108, and one or more identity servers 112. The mobile communication device 104 may be configured to communicate directly with the reader 108 via a direct communication channel 120. Alternatively, or additionally, the mobile communication device 104 may be configured to exchange information with the reader 108 via a communication network 116. In some embodiments, the identity server(s) 112 may also be configured to exchange information with the mobile communication device 104 and/or reader 108 via the communication network 116.

As shown in FIG. 1, the mobile communication device 104 may be carried by a first user 124 whereas the reader 108 may be carried or operated by a second user 128. As will be discussed in further detail herein, the first user 124 may correspond to a user whose identity is stored, maintained, augmented, and/or managed by the identity server(s) 112. The second user 128 may correspond to a user that wishes to confirm at least some information about the first user˜s 124 identity and, in some embodiments, may utilize the reader 108 as part of an identity confirmation process. The sharing of identity information for the first user 124 may be permissioned by the first user˜s 124 mobile communication device 104 or may be sent by the first user˜s 124 mobile communication device 104 to the reader 108. The second reader 128 may utilize the reader 108 to receive the identity information shared by the first user 124 and, in some embodiments, may request additional identity information from either the mobile communication device 104 or the identity server(s) 112.

The mobile communication device 104 may correspond to any type of computing device that is portable in nature. While the mobile communication device 104 is depicted as a particular type of device, such as a cellular phone, smart phone, or the like, it should be appreciated that the mobile communication device 104 may correspond to any type of device that is configured to be carried by the user 124, is capable of communicating directly with a reader 108, and/or is capable of communicating via the communication network 116. As some non-limiting examples, the mobile communication device 104 may be provided as a cellular phone, smart phone, tablet, PDA, wearable device, portable credential card, key fob, or the like.

The reader 108 may correspond to any type of device that is capable of communicating with the mobile communication device 104 and/or identity server(s) 112 via the communication network 116. In some embodiments, the reader 108 may correspond to a mobile device that is configured to be carried and moved by the second user 128. In some embodiments, the reader 108 may correspond to a device that has a fixed location, such as a point of sale (POS) device. In some embodiments, the reader 108 may correspond to another mobile communication device that functions to read data from the mobile communication device 104 via the direct communication channel 120. The reader 108 may be equipped with a user interface that enables the second user 128 to view data communicated to the reader 108 either by the mobile communication device 104 or the identity server(s) 112. The user interface may include a graphical user interface, an LED, a collection of LEDs, or the like.

Functionality of the system 100 may be facilitated by operation of the identity server(s) 112. While FIG. 1 depicts the system 100 as having only one identity server 112, it should be appreciated that the functionality of the identity server(s) 112 may be distributed among a plurality of servers. Alternatively or additionally, some functionality of the identity server(s) 112 may be provided on the mobile communication device 104 or some other node in the system 100.

The identity server(s) 112 may be provided with functionality that enables communication with the mobile communication device 104 and/or reader 108. In addition, the identity server(s) 112 may be provided with functionality that enables the creation of an identity for one or multiple users (e.g., the first user 124), management of the identity and identity information, storage of the identity and identity information, augmentation of the identity, sharing of the identity, assertions of the identity, and other associated tasks. In some embodiments, the identity server(s) 112 may include one or more machine learning processes or neural networks that enable functionality or improvements to functionality of the identity server(s) 112.

The communication network 116 may correspond to any known type of network that facilitates machine-to-machine communications. The network 116 may use the same communication protocols or different protocols without departing from the scope of the present disclosure. In some embodiments, the devices 104, 108, 112 connected with the network 116 may be configured to communicate using various nodes or components of the communication network 116. The communication network 116 may correspond to one or many different networks, and may also comprise any type of known communication medium or collection of communication media and may use any type of protocols to transport messages between endpoints. The network 116 may include wired and/or wireless communication technologies. The Internet is an example of a communication network that constitutes an Internet Protocol (IP) network consisting of many computers, computing networks, and other communication devices located all over the world, which are connected through many telephone systems and other means. Other examples of a communication network include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 116 need not be limited to any one network type, and instead may be comprised of a number of different networks and/or network types. Moreover, the communication network 116 may include a number of different communication media such as coaxial cable, copper cable/wire, fiber-optic cable, antennas for transmitting/receiving wireless messages, and combinations thereof.

The direct communication channel 120 may correspond to a proximity-based communication link that is established between the mobile communication device 104 and the reader 108. The communication channel 120 may be used to enable authentication between the mobile communication device 104 and reader 108, exchange data between the mobile communication device 104 and reader 108, and the like. The type of protocol used for the channel 120 may be selected to ensure that the mobile communication device 104 is within a predetermined distance of the reader 108. Non-limiting examples of protocols that can be used to establish or maintain the channel 120 include NFC, Bluetooth, ultra-wide band (UWB), WiFi, Infrared, or any other wireless communication protocol that has or can be configured for a fixed communication range of no more than 50 meters and possibly no more than 5 meters.

Figure 2:
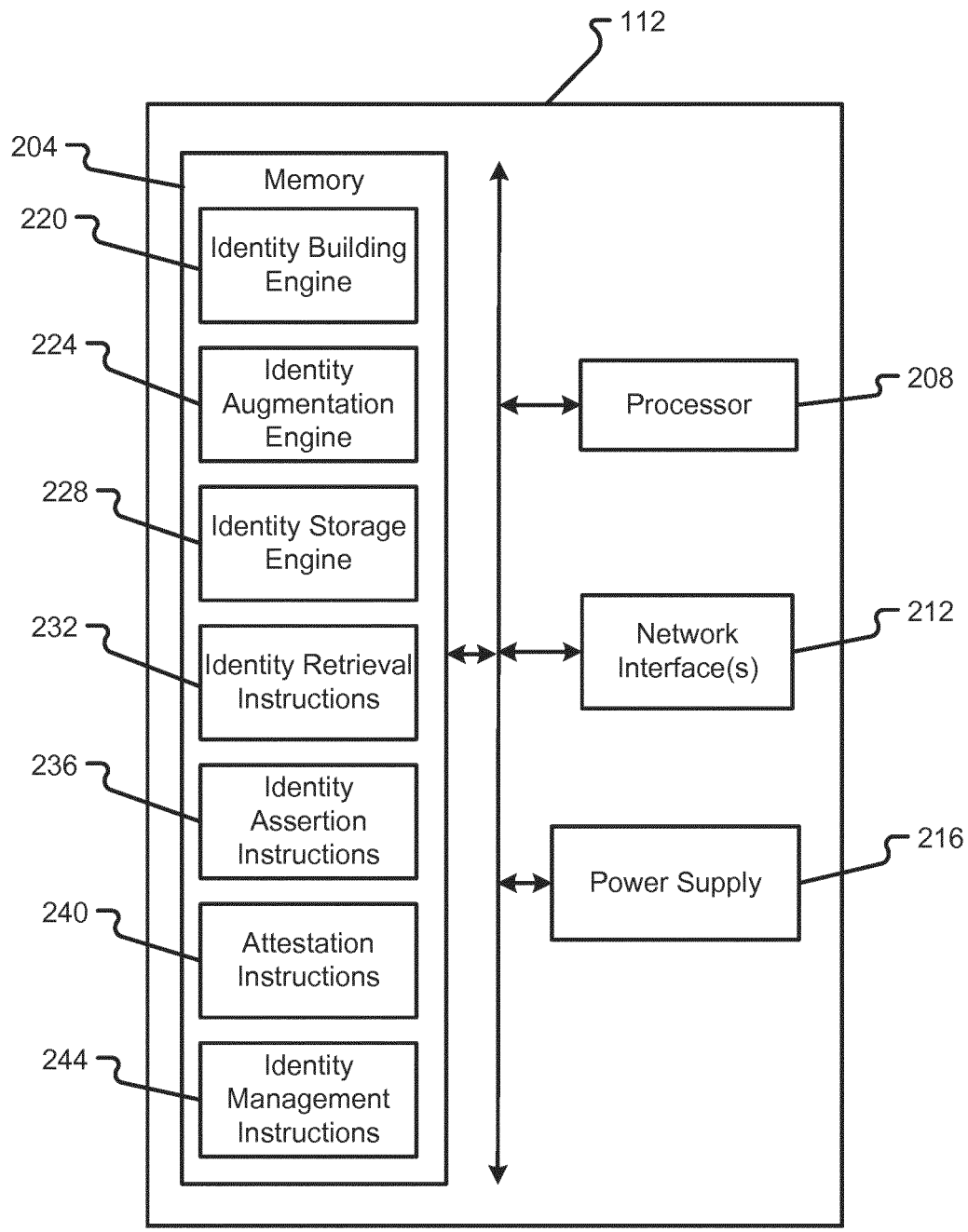
FIG. 2 is a block diagram depicting an identity server in accordance with at least some embodiments of the present disclosure.

With reference now to FIG. 2, additional details of an identity server 112 will be described in accordance with at least some embodiments of the present disclosure. As mentioned above, some components of the server 112 may be distributed among a plurality of servers or similar computational devices without departing from the scope of the present disclosure.

The server 112 is shown to include computer memory 204, a processor 208, one or more network interfaces 212, and a power supply 216. These various resources of the server 112 may enable functionality of the identity server 112 as will be described herein. In some embodiments, the memory 204 may correspond to a computer-readable storage medium that is configured to store a number of processor-executable instruction sets. In addition to storing traditional computer programs or discrete instruction sets that receive an input and variables and provide an output based on the input and variables, the memory 204 may also be used to store one or more Artificial Intelligence (AI) programs that are configured to receive inputs and process the inputs through one or more neural networks. The AI program(s) stored in memory 204 may also be configured to be trained or otherwise updated in an autonomous or semi-autonomous manner.

The memory 204, in some embodiments, may include any type of computer memory device or collection of computer memory devices. Non-limiting examples of memory 204 include Random Access Memory (RAM), Read Only Memory (ROM), flash memory, Electronically-Erasable Programmable ROM (EEPROM), Dynamic RAM (DRAM), etc. The memory 204 may be configured to store the instruction sets depicted in addition to temporarily storing data for the processor 208 to execute various types of routines or functions. Illustrative instruction sets that may be stored in memory 204 include, without limitation, an identity building engine 220, an identity augmentation engine 224, an identity storage engine 228, identity retrieval instructions 232, identity assertion instructions 236, attestation instructions 240, and identity management instructions 244. Functions of the server 112 enabled by these various instruction sets will be described in further detail herein. It should be appreciated that the instruction sets depicted in FIG. 2 may be combined (partially or completely) with other instruction sets or may be further separated into additional and different instruction sets, depending upon configuration preferences for the server 112. Said another way, the particular instruction sets depicted in FIG. 2 should not be construed as limiting embodiments described herein.

Each of the instructions sets may correspond to a single discrete computer program or multiple computer programs that exchange inputs and outputs with one another. As will be described in further detail herein, the various processing engines (e.g., the identity building engine 220, the identity augmentation engine 224, and identity storage engine 228) may include a number of sub-routines and/or AI components. Details of these various engines will be described in further detail herein. While described as more complex routines, it should be appreciated that the various engines may be implemented as simpler instruction sets without departing from the scope of the present disclosure.

The identity retrieval instruction set 232 may, when executed by the processor 208, enable the identity server 112 to retrieve a user's identity or at least some information from a user's identity. The identity retrieval instructions may cooperate with other routines, instruction sets, or engines in memory 204 to retrieve a user's identity or at least some information from the user's identity from a remote data storage location. As will be discussed in further detail herein, the user's identity may be stored as one or more blocks in a distributed ledger, which means that some of the user's identity may be stored among a plurality of different data storage devices (e.g., in a distributed fashion). In some embodiments, some of the user's identity may be stored locally on the user's mobile communication device 104. In some embodiments, some of the user's identity may be stored in a remote, but centrally-managed database rather than being stored in a distributed ledger. The identity retrieval instructions 232 may contain functionality that tracks where a user's identity or particular aspects of a user's identity are stored and may further contain functionality to retrieve a user's identity for purposes of update, assertion, attestation, and the like.

The identity assertion instruction set 236 may, when executed by the processor 208, enable the identity server 112 to assert a user's identity or at least some information from a users identity to some other user for purposes of identity verification. For example, the identity assertion instruction set 236 may be configured to obtain information from a user's identity (e.g., that has been retrieved by the identity retrieval instruction set 232) and communicate that information to another communication device, such as reader 108. In some embodiments, the identity assertion instruction set 236 may be configured to extract only necessary information from a user's identity prior to assertion. For example, the identity retrieval instruction set 232 may be configured to retrieve all information associated with a user's identity and then the identity assertion instruction set 236 may be configured to extract only that information required for purposes of assertion. Enabling the identity assertion instruction set 236 to filter identity information exchanged with other devices helps limit the unnecessary distribution of identity information for a user, such as the first user 124. For example, if a second user 128 needs to confirm the first user's 124 age is over 21 (e.g., for purposes of purchasing alcohol or gambling), the identity assertion instruction set 236 may be configured with intelligence that determines the minimum amount of identity information needed by the verification entity (e.g., second user 128) and only distributes that minimum amount of identity information. In other words, the identity assertion instructions 236 may be configured to not share identity information that is not requested or required by the validating entity.

The attestation instruction set 240 may, when executed by the processor 208, enable the identity server 112 to request identity attestations from other entities, accept identity attestations from other entities, provide identity attestations to other entities, and store attestations with a user's identity. In some embodiments, the attestation instruction set 240 may be configured to manage attestation processes that occur between individuals and other organizations, attestation processes that occur between different individuals, and attestation processes that occur between organizations. As will be described in further detail herein, attestations issued by an entity may be stored in connection with a user's identity. As a non-limiting example, an attestation may be stored as a data element in a block of a distributed ledger with a reference to another block that stores the user's identity.

The identity management instruction set 244 may, when executed by the processor 208, enable the identity server 112 to manage a user's identity, including the storage and sharing of a user's identity. In some embodiments, the identity management instruction set 244 may be configured to track and record where a user's identity is stored, where the users identity has been shared, and/or maintain a log related to other transactions associated with a user's identity. In some embodiments, the identity management instruction set 244 may be configured to provide a user with a dashboard for managing their identity, manage passwords for accessing and changing a user's identity, and provide other services in connection with enabling a user to access their identity. The identity management instruction set 244 may also be configured to enable a user to define when and with whom the user's identity (or information therefrom) can be shared.

The processor 208 may correspond to one or many computer processing devices. For instance, the processor 208 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 208 may be provided as a microprocessor, Central Processing Unit (CPU), or plurality of microprocessors or CPUs that are configured to execute the instructions sets stored in memory 204. Upon executing the instruction sets stored in memory 204, the processor 208 enables various types of identity creation, management, and sharing functions.

The network interface(s) 212 may provide the server 112 with the ability to send and receive communication packets over the communication network 116. The network interface 212 may be provided as a network interface card (NIC), a network port, drivers for the same, and the like. Communications between the components of the server 112 and other devices connected to the communication network 116 may all flow through the network interface 212.

The power supply 216 may correspond to an integrated power supply device (e.g., a battery) and/or a power conversion device that is configured to convert external AC power into useable power for the various components of the server 112. In some embodiments, the power supply device 216 may include one or more devices that are capable of conditioning external power into DC current with a stepped voltage that can be used by the memory 204, processor 208, and network interface(s) 212.

Figure 3:
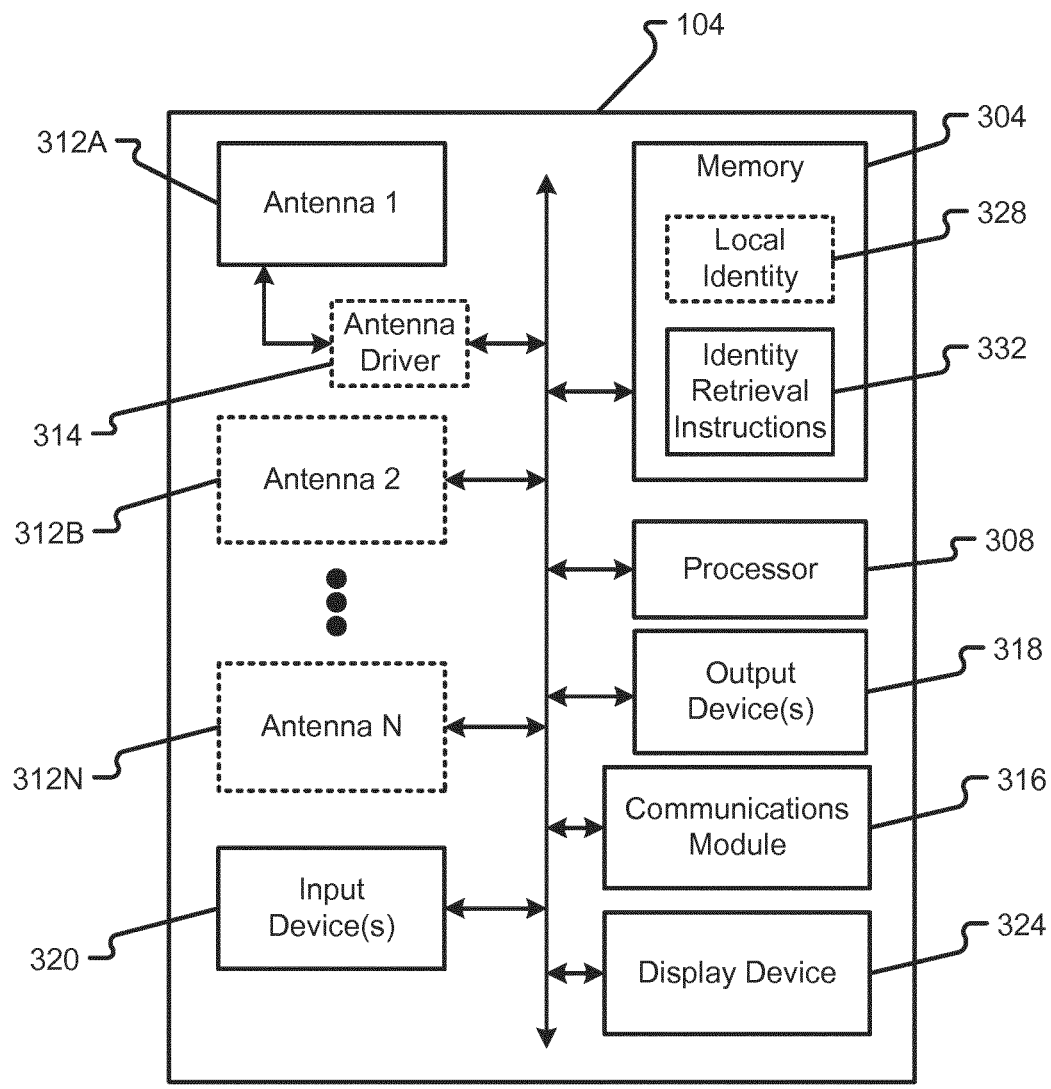
FIG. 3 is a block diagram depicting a mobile communication device in accordance with at least some embodiments of the present disclosure.

With reference now to FIG. 3, additional details of a mobile communication device 104 will be described in accordance with at least some embodiments of the present disclosure. The mobile communication device 104 may include one or more components, such as, a memory 304, a processor 308, an antenna 312A-N, a communications module 316, one or more input devices 320, and one or more display devices 324. In some embodiments, the mobile communication device 104 may further include a power module, such as a battery and one or more conversion circuits suitable to convert external power into useable power for components of the mobile communication device 104.

The memory 304 of the mobile device 104 may be used in connection with the execution of application programming or instructions by the processor 308, and for the temporary or long-term storage of program instructions and/or data. The memory 304 may contain executable instructions that are used by the processor 308 to run other components of the mobile communication device 104. In one embodiment, the memory 304 may be configured to store some or all identity information for a user. Such identity information may be referred to as local identity 328. To the extent that less than all of a user's identity is stored as a local identity 328, the memory 304 may also contain an identity retrieval instruction set 332. Capabilities of the identity retrieval instruction set 332 may be similar or identical to the identity retrieval instruction set 232 depicted and described in connection with FIG. 2.

Although not depicted, the memory 304 may also be configured to store instructions that enable the mobile communication device 104 to communicate via the communication network 116 and/or with the reader 108. Such instructions may include a browser application (e.g., Safari, Firefox, Chrome, Microsoft Edge, Opera, Vivaldi, or the like). Instructions that enable the mobile communication device 104 to communicate with the reader 108 may include Bluetooth instructions, NFC instructions, UWB instructions, Wi-Fi instructions, etc. In some embodiments, the memory 304 may comprise volatile or non-volatile memory. Non-limiting examples of memory 304 that may be utilized in the mobile communication device 104 include RAM, ROM, buffer memory, flash memory, solid-state memory, or variants thereof.

The processor 308 may correspond to one or many microprocessors that are contained within the housing of the mobile communication device 104 with the memory 304. In some embodiments, the processor 308 incorporates the functions of the user devices Central Processing Unit (CPU) on a single Integrated Circuit (IC) or a few IC chips. The processor 308 may be a multipurpose, programmable device that accepts digital data as input, processes the digital data according to instructions stored in its internal memory, and provides results as output. The processor 308 implements sequential digital logic as it has internal memory. As with most known microprocessors, the processor 308 may operate on numbers and symbols represented in the binary numeral system.

The one or more antennas 312A-N may be configured to enable wireless communications between the mobile communication device 104 and a reader 108. As can be appreciated, the antenna(s) 312A-N may be arranged to operate using one or more wireless communication protocols and operating frequencies including, but not limited to, Bluetooth+, BLE, NFC, UWB, ZigBee, GSM, CDMA, Wi-Fi, RF, and the like. By way of example, the antenna(s) 312A-N may be RF antenna(s), and as such, may transmit RF signals through free-space to be received by a reader 108 having an RF transceiver. One or more of the antennas 312A may be driven or operated by a dedicated antenna driver 314.

As mentioned above, the mobile communication device 104 may include a power module. The power module may be configured to provide power to the parts of the mobile communication device 104 in order to operate. The power module may store power in a capacitor of the power module. In one embodiment, electronics in the power module may store energy in the capacitor and turn off when an RF field is present. This arrangement can ensure that energy is presented to the mobile communication device 104 minimizing any effect on read distance. For example, the power module may include a battery or other power source to supply power to parts of the mobile communication device 104. The power module may include a built-in power supply (e.g., battery) and/or a power converter that facilitates the conversion of externally-supplied AC power into DC power that is used to power the various components of the mobile device 104. In some embodiments, the power module may also include some implementation of surge protection circuitry to protect the components of the mobile device 104 from power surges.

The mobile device 104 may include a communications module 316 that is configured to communicate with one or more different systems or devices either remote or local to the mobile communication device 104. Thus, the communications module 316 can send or receive messages to or from servers, tags, readers 108, other mobile communication devices 104, etc.

The input device(s) 320 may include at least one device sensor. Illustrative but non-limiting sensors include one or more biometric sensors (e.g., heart rate, body temperature and/or heat signature, blood pressure, etc.), capacitive sensors, light sensors, image sensors, temperature sensors, pressure sensors, contact sensors, magnetic sensors, radio indoor positioning sensors, location services sensors and/or devices, combinations thereof, and the like. As can be appreciated, one or more of these sensors may alternatively or additionally be incorporated into a wearable device. Yet another type of suitable sensor that can be included in the input device(s) 320 is a location sensor. A location sensor may be configured to determine a geographical location and/or position of the mobile communication device 104 and/or a position of the mobile communication device 104 relative to a known location. In one embodiment, this location may be based on Global Positioning System (GPS) data provided by a GPS module of the mobile communication device 104. In some embodiments, the location of the mobile device 104 may be provided based on cell tower data, Wi-Fi information, iBeacon information, UWB information, and/or some other location information provided by a location module and/or a communications module 316 of the mobile communication device 104.

In some embodiments, the mobile device 104 may include a user interface and a network interface. The user interface may or may not include one or more input devices 320 and/or display devices 324. Examples of suitable user input devices that may be included in the user interface include, without limitation, one or more buttons, a keyboard, a mouse, a touch-sensitive surface, a pen, a camera, a microphone, etc. Examples of suitable user output devices that may be included in the user interface include, without limitation, a display screen, a touchscreen, one or more lights, a speaker, etc. It should be appreciated that the user interface may also include a combined user input and user output device, such as a touch-sensitive display or the like.

The network interface may comprise hardware that facilitates communications with other communication devices over the communication network 116. The network interface may include an Ethernet port, a Wi-Fi card, a Network Interface Card (NIC), a cellular interface (e.g., antenna, filters, and associated circuitry), or the like. The network interface, in some embodiments, may correspond to a combination of the communications module 316 and an antenna 312a-N and may be configured to facilitate a connection between the mobile communication device 104 and the communication network 116 and may further be configured to encode and decode communications (e.g., packets) according to a protocol utilized by the communication network 116.

If NFC is being used for the communication channel, then the reader 108 and mobile device 104 may have their interfaces/antennas inductively coupled to one another at which point the reader 108 and/or mobile device 104 will authenticate or mutually authenticate with one another. Following authentication, the reader 108 may request a key or multiple keys from the mobile communication device 104, or the mobile communication device 104 may offer a key or multiple keys to the reader 108.

If, for instance, BLE or some other non-inductive protocol (e.g., UWB, Wi-Fi) is being used for the channel 120, then the reader 108 and mobile communication device 104 may perform a discovery routine prior to pairing with one another or otherwise connecting to establish the channel 120. After the channel is established, however, the reader 108 and mobile communication device 104 may then authenticate one another and exchange relevant information, such as the payload of data, to enable the mobile device 104 to eventually share some form of identity information with the reader 108.

Figure 4:
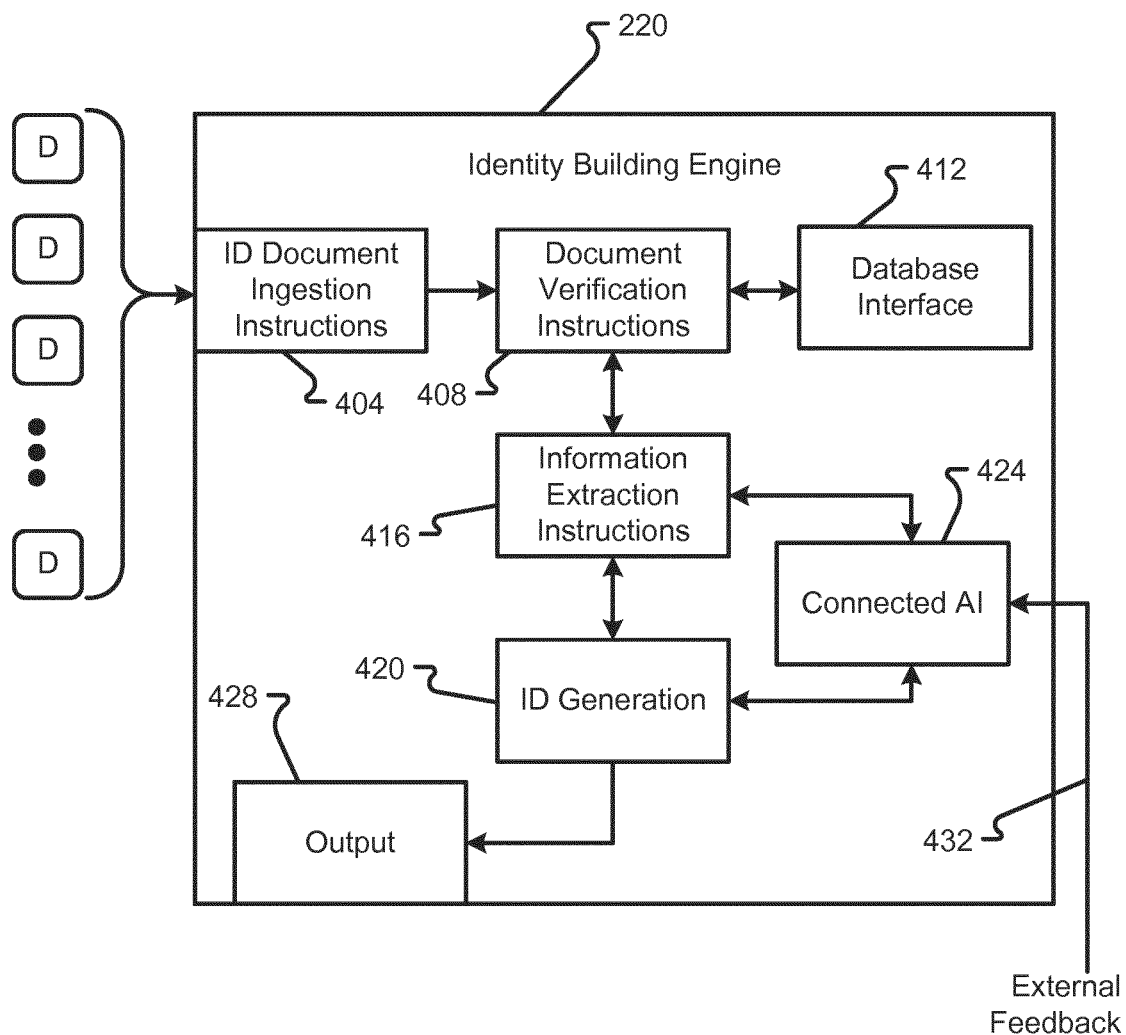
FIG. 4 is a block diagram depicting details of an identity building engine in accordance with at least some embodiments of the present disclosure.

With reference now to FIG. 4, additional details of an identity building engine 220 will be described in accordance with at least some embodiments of the present disclosure. The identity building engine 220 is shown to include an identity document ingestion instruction set 404, a document verification instruction set 408, a database interface 412, an information extraction instruction set 416, an ID generation instruction set 420, a connected Artificial Intelligence (AI) 424, and an output 428. In some embodiments, each of the different instruction sets may be provided as discrete computer instruction sets that are stored in memory 204. In some embodiments, various components of the identity building engine 220 may correspond to routines that are called by the identity building engine 220 rather than being integrated as part of the identity building engine 220.

The identity document ingestion instruction set 404 may be configured to accept a number of different identity documents D. In some embodiments, the different identity documents D may correspond to government issued documents (e.g., passport, driver˜s license, social security card, pilot license, fishing license, state bar cards for attorneys, etc.), organization issued documents (e.g., work badge, access card, merchant rewards cards, credit cards, diplomas, educational transcripts, test results, etc.), personally issued documents (e.g., resume, social network identities, user name, passwords, biometric templates, selfies, etc.). As can be appreciated, the identity documents D may be provided as a physical document, an electronic document, or a combination of the two. The identity document ingestion instruction set 404 may be configured to accept the identity documents D, possibly of different types, and reformat the information from the identity documents D into a common format that is useable or capable of being processed by the other components of the identity building engine 220. As an example, the identity document ingestion instruction set 404 may operate as a translation engine that is configured to extract one or more images, symbols, characters, or the like from the identity documents D. Once the information from the identity documents D has been reformatted or translated by the identity document instruction set 404, the reformatted or translated information may then be provided to the document verification instruction set 408 and information extraction instruction set 416 for further processing.

In some embodiments, the document verification instruction set 408 may be configured to analyze a format of an identity document D itself. As a non-limiting example, the document verification instruction set 408 may be configured to accept one or more images of the entire identity document D and compare the one or more images to a database of images of similar identity documents that have previously been verified as authentic and from a trusted issuing source. Continuing this example, the document verification instruction set 408 may be configured to analyze one or more images of a passport document and confirm that the format of the document itself (as compared to the content of the document) conforms to a known format of a passport. That is to say, the document verification instruction set 408 may be configured to check a number of digits in a particular information field of the passport to confirm that the number of digits matches the number of digits that should be in the particular information field. In some embodiments, the document verification instruction set 408 may utilize the database interface 412 to access various external databases that can provide knowledge or information related to identity document formats from a particular issuing entity. The document verification instruction set 408 may be responsible for checking the format of an ingested identity document D to ensure that the format is a trusted format before committing other processing resources of the identity building engine 220 to further processing of the information from the identity document D. If the document verification instruction set 408 is unable to confirm a format match (or determines the format of the identity document is likely to have been issued by a counterfeiter), then the document verification instruction set 408 will discard the identity document D and its information from the identity building engine 220. This effectively ensures that the other components of the identity building engine 220 are not further and unnecessarily burdened and also ensures that the connected AI 424 is not accidentally trained on a bad identity document D.

In addition to verifying a format of the identity document D, the document verification instruction set 408 may be configured to search the identity document D for one or more required security features (e.g., holograms, windows, security images, watermarks, etc.). The document verification instruction set 408 may communicate with the purported issuer of the identity document D via the database interface 412 to determine what types of security features to search for and where such security features should be located on the identity document D normally issued by that issuer. If the identity document D is determined to lack one or more of the security features, then the identity document D may be discarded from further processing. In some embodiments, the document verification instruction set 408 may obtain one or more multi-spectral images of the identity document D as part of searching for the security feature(s). This may require the document verification instruction set 408 to have access to and the ability to control a multi-spectral imaging device or some other piece of hardware that is capable of obtaining the necessary images of the identity document D. Such hardware may, alternatively, be operated by the identity document ingestion instructions 404 without departing from the scope of the present disclosure.

If, however, the document verification instruction set 408 either confirms the format of an identity document D or at least does not discard the identity document D as a possible counterfeit, the information extraction instruction set 416 may receive the images or other reformatted/translated information of the identity document D and begin extracting relevant content from the identity document D. In some embodiments, the information extraction instruction set 416 may be configured to scan all of the reformatted or translated information provided by the identity document ingestion instruction set 404 and extract only those portions of information that will be used by the ID generation instruction set 420. As a non-limiting example, the information extraction instruction set 416 may be configured to extract a users name, address, citizenship, image, fingerprint, etc. from the identity document D and ignore other portions of the identity document D, such as colors, issuance dates, issuing entity, expiration dates, etc.

The information extraction instruction set 416 may further cooperate with the connected AI 424 and ID generation instruction set 420 to build a user˘s identity. In some embodiments, the connected AI 424 may be trained on a base data set that includes a number of different identity documents D from a number of different issuers. The connected AI 424 may also be configured to be trained and re-trained based on external feedback 432, which may include user feedback and/or administrative feedback. In some embodiments, the connected AI 424 may be configured to process the identity information extracted by the information extraction instructions 416 through one or more neural networks. The one or more neural networks may be configured to process the identity information extracted by the information extraction instructions 416 and provide an output that is either useable by the ID generation instruction set 420 as part of generating a users ID or can be directly included in a user˘s identity by the ID generation instruction set 420. As noted above, as additional user identities are built by the identity building engine 220 and those additional identities are determined to be useful, accurate, and capable of being asserted by the user, the connected AI 424 may be updated or trained to include those additional identities as part of a base model used by the neural network(s) of the connected AI 424.

As the ID generation instruction set 420 generates an identity for a user, the ID generation instruction set 420 may provide the output 428 with the user˘s identity so that the output 428 can provide the user˘s identity to other components of the server 112 or to the user˘s mobile communication device 104. In some embodiments, the output 428 may be configured to format a user˘s identity for communication to other engines 224, 228 or other instruction sets stored in memory 204.

Figure 5:
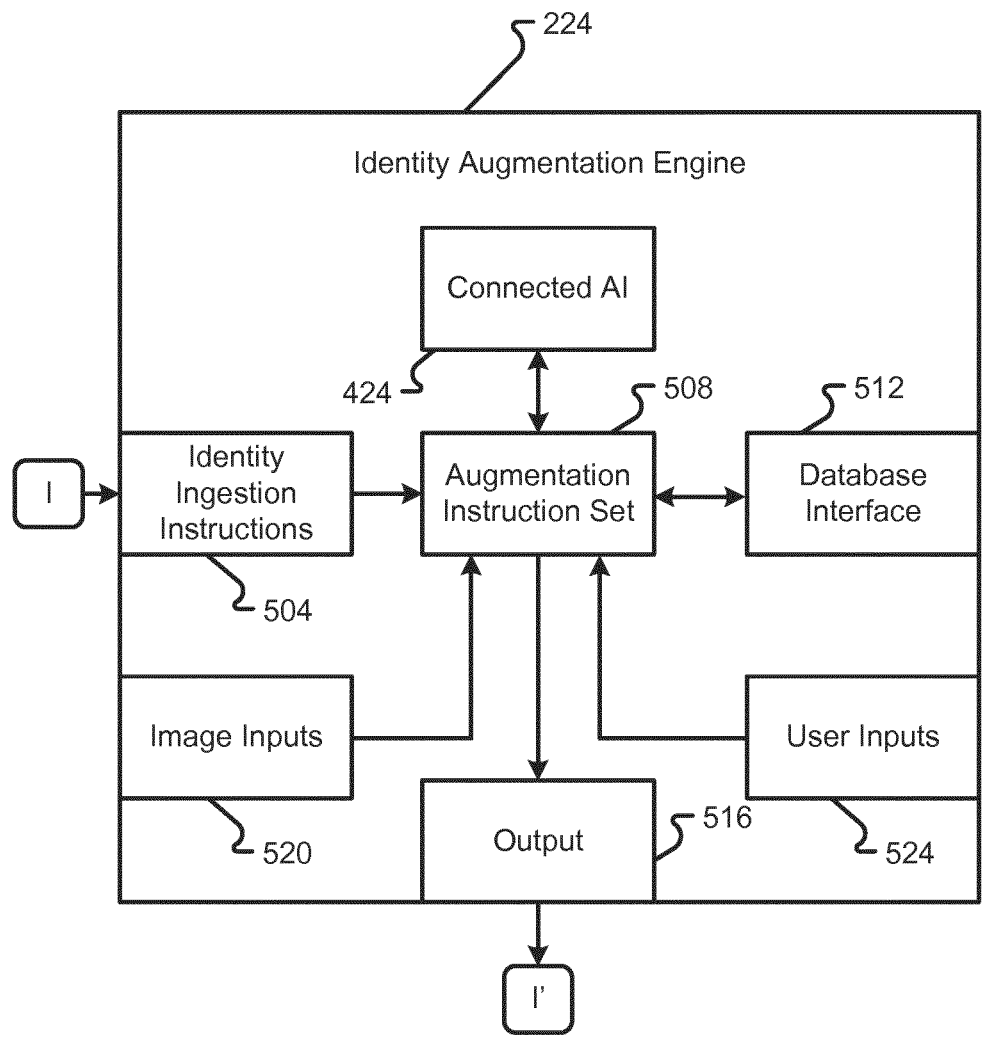
FIG. 5 is a block diagram depicting details of an identity augmentation engine in accordance with at least some embodiments of the present disclosure.

With reference now to FIG. 5, additional details of an identity augmentation engine 224 will be described in accordance with at least some embodiments of the present disclosure. As with other engines depicted and described herein, the construction of the identity augmentation engine 224 and its components should not be construed as being limited to the example of FIG. 5. Rather, certain components of the identity augmentation engine 224 may be provided as sub-routines in other engines or may be completely combined with other engines in the server 112. Alternatively or additionally, components of the identity augmentation engine 224 may be provided as separate instruction sets stored in memory 204 without departing from the scope of the present disclosure.

The identity augmentation engine 224 is illustratively shown to include a connected AI 424, an identity ingestion instruction set 504, an augmentation instruction set 508, a database interface 512, image inputs 520, user inputs 524, and an output 516. As can be appreciated by one of skill in the art, the connected AI 424 may be the same or similar to the connected AI 424 of the identity building engine 220. In some embodiments, the connected AI 424 may correspond to one or more neural networks, which may or may not be included in the server 112.

The identity ingestion instruction set 504 may be configured to receive a user˘s identity I, or information therefrom, and reformat or translate the user˘s identity I into data that is capable of being processed by the other components of the identity augmentation engine 224. In some embodiments, the identity ingestion instruction set 504 may be configured to receive the users identity I in a format provided by the output 428. Alternatively or additionally, the identity ingestion instruction set 504 may be configured to obtain a user˘s identity I from a storage location, such as from a distributed ledger entry(ies) or from some other database.

In some embodiments, a user˘s identity I is received in a first format and information from the user˘s identity I is provided to the augmentation instruction set 508 in a second format that is compatible with the processing routines of the instruction set 508. The augmentation instruction set 508 may be configured to augment, strengthen, or further update the user˘s identity I into an augmented identity I˘. Part of augmenting a user˘s identity I into an augmented identity I˘ may involve the connected AI 424 and augmentation instruction set 508 processing additional information received from the user or received from an entity with which the user has claimed a relationship (e.g., a previous organization or individual that was referenced by the user as part of building or enhancing their identity I). In some embodiments, the augmentation instruction set 508 may be configured to augment the user˘s identity I only in response to one or more additional inputs that were not received as part of initially building the user˘s identity I. Examples of such additional inputs may include, without limitation, a selfie or real-time image captured by the user, utility bills, proof of residence information, proof of employment information, and the like.

The augmentation instruction set 508 may be configured to receive these additional inputs, if provided as a selfie or real-time image, via the image inputs 520. The augmentation instruction set 508 may also be configured to test or query the user about other details of the user˘s history. The user may be able to answer such questions via the user inputs 524, which may be connected to a keypad, mouse, stylus, speech-to-text converter, etc. These additional inputs, in addition to any intelligence offered by the connected AI 424, may enable the augmentation instruction set 508 to further enhance a user˘s identity I into an augmented identity I˘. For instance, the augmentation instruction set 508 may be configured to ensure that at least a minimum number of additional inputs are received and verified with an external entity prior to augmenting a user˘s identity I. As a more specific, but non-limiting example, the augmentation instruction set 508 may be configured to further verify a user's real-time image or selfie substantially matches an image captured during the creation of the user's identity I. If a substantial match is found or if a sufficient number of additional sources of information are received, then the augmentation instruction set 508 may be configured to augment the user's identity I into an augmented identity I˜, which may have a stronger confidence score associated therewith. The confidence score of a user's identity I or augmented identity I˜ may be used as a basis for determining whether the user's assertion of their identity can be trusted, whether the user's augmented identity I˜ should be stored as part of a distributed ledger entry that references the entry for the user's original identity I, etc.

In some embodiments, the database interface 512 may enable the augmentation instruction set 508 to access a plurality of different databases operated by different entities as part of verifying a user's identity is further associated with other entities or locations (e.g., a utility company, a particular residence, a school, a business, etc.). The database interface 512, much like the database interface 412, may include query/response capabilities that enable the identity augmentation engine 224 to read or write certain types of information from a centralized database or from a distributed ledger. The database interface 512 may also include functionality sufficient to translate information received from an external database into a format that is useable by the augmentation instruction set 508.

The output 516 may be configured to perform a reverse transformation or reformatting process to the transformation or reformatting performed at the identity ingestion instruction set 504. Thus, the output 516 may be configured to write the user's augmented identity I˜ back to a database or distributed ledger entry. Alternatively or additionally, the output 516 may correspond to a routine within the engine 224 that simply provides information related to a user's augmented identity I˜ to another component of the server 112 (e.g., the identity storage engine 228).

Figure 6:
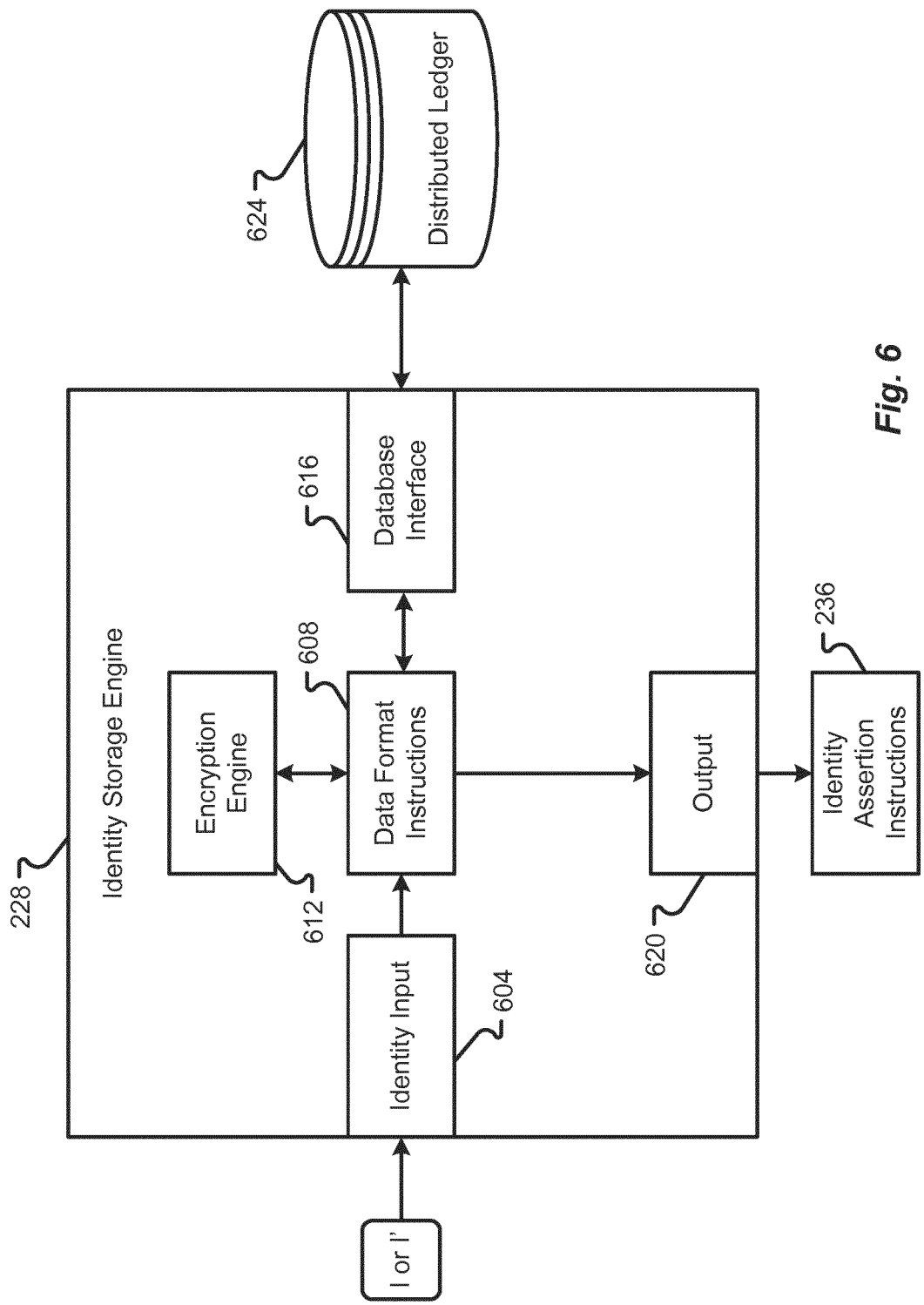
FIG. 6 is a block diagram depicting details of an identity storage engine in accordance with at least some embodiments of the present disclosure.

With reference now to FIG. 6, additional details of an identity storage engine 228 will be described in accordance with at least some embodiments of the present disclosure. The identity storage engine 228 is shown to include an identity input 604, a data format instruction set 608, an encryption engine 612, a database interface 616, and an output 620.

The identity input 604 may be configured to receive a user's identity I or an augmented identity I˜ from any of the components in memory 204. In some embodiments, the identity input 604 is configured to receive the user's identity I or I˜ or particular information associated with the user's identity I or I˜ and then provide the user's identity I or I˜ to the data format instruction set 608.

The data format instruction set 608 may format the user's identity I or I˜ into any type of data format that is suitable for storage in a database. For instance, if the user's identity I or I˜ is to be stored within a distributed ledger 624, then the data format instruction set 608 may be configured to format the information of the user's identity I or I˜ such that the information can be stored as one or more data blocks within the distributed ledger 624. The data format instruction set 608 may also be configured to leverage the encryption engine 612 if any portion of the user's identity I or I˜ is to be encrypted prior to being stored into the distributed ledger 624. As a non-limiting example, the data format instructions 608 may use one or more private encryption keys provided by the encryption engine 612 to symmetrically or asymmetrically encrypt the data prior to writing the data onto the distributed ledger 624. Data may be encrypted on a block-by-block basis. Alternatively, some portions of a user's identity I or I˜ may not be encrypted (e.g., reference signatures or the like) whereas other portions of the user's identity I or I˜ may be encrypted.

In some embodiments, the database interface 616 may be configured to implement the writing of a user's identity I or I˜ onto the distributed ledger 624. The database interface 616 may also be configured to retrieve a user's identity I or I˜ or at least some information associated with a user's identity I or I˜ using one or more data retrieval routines. When a user's identity I or I˜ is retrieved by the database interface 616, the user's identity I or I˜ may be retrieved for purposes of asserting the identity I or I˜ to another user. Thus, the database interface 616 may retrieve the necessary portions of a user's identity I or I˜ from the distributed ledger 624 and the data format instruction set 608 may reformat the retrieved portions of the user's identity I or I˜ prior to passing the user's identity I or I˜ onto the identity assertion instruction set 236. In some embodiments, the output 620 may operate as the component of the identity storage engine 228 that provides the user's identity I or I˜ (or at least a portion thereof) to the identity assertion instruction set 236 or any other component of memory 204 that is processing the user's identity I or I˜.

Figure 7:
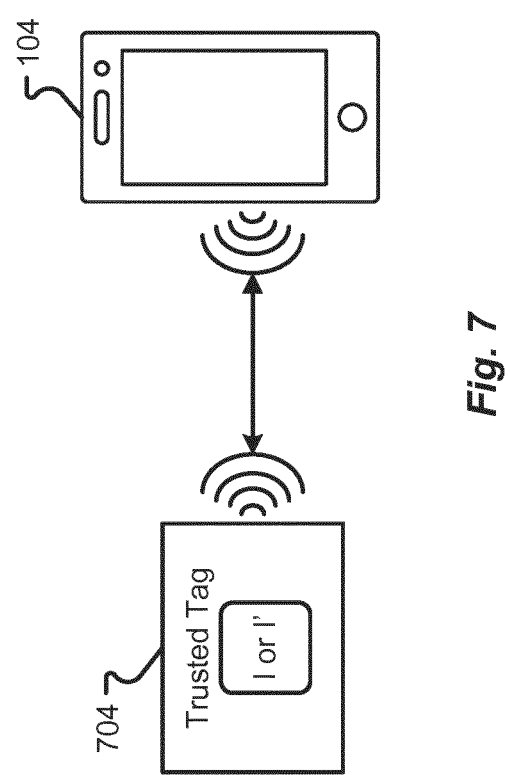
FIG. 7 is a diagram depicting interactions between a mobile communication device and a trusted tag in accordance with at least some embodiments of the present disclosure.

In some embodiments, as shown in FIG. 7, a user's identity I or I˜ may also be stored in memory of a tag 704 or similar type of device. The tag 704, as will be discussed in further detail herein, may include computer memory for storing the user's identity I or I˜ as well as a processor and communication interface that enable the tag 704 to exchange data with a user's mobile communication device 104. In some embodiments, when a user's identity I or I˜ has been built by the identity server(s) 112, the user's identity I or I˜ may be stored onto the distributed ledger 624. In addition to storage onto the distributed ledger 624, encryption keys and/or portions of the user's identity I or I˜ may also be stored onto the tag 704, which may be physically distributed (e.g., mailed, couriered, hand-delivered, etc.) to the user whose identity has been created (e.g., the first user 124). In some embodiments, the tag 704 may operate as the user's 124 key to access the user's identity I or I˜ that is cryptographically stored in the distributed ledger 624. In some embodiments, the private and/or public encryption keys that can be used to store and retrieve the user's identity I or I˜ from the distributed ledger 624 may be kept on the tag 704. When the user 124 receives the physical tag 704, the tag 704 may be brought within a communication range of the mobile communication device 104 so that the user's identity I or I˜ can be useable or assertable by the user's mobile communication device 104. In other words, after the user 124 receives their tag 704 and the user's identity I or I˜ has been created by the server 112 and stored onto the distributed ledger 624, the tag 704 can provide information to the mobile communication device 104 that enables the mobile communication device 104 to also access the user's identity I or I˜ on the distributed ledger 624, effectively enabling the mobile communication device 104 to assert and make user of the user's identity I or I˜. Communication between the tag 704 and mobile communication device 104 may be facilitated by any form of Bluetooth communication protocol, NFC, UWB, Wi-Fi, or the like.

Figure 8:
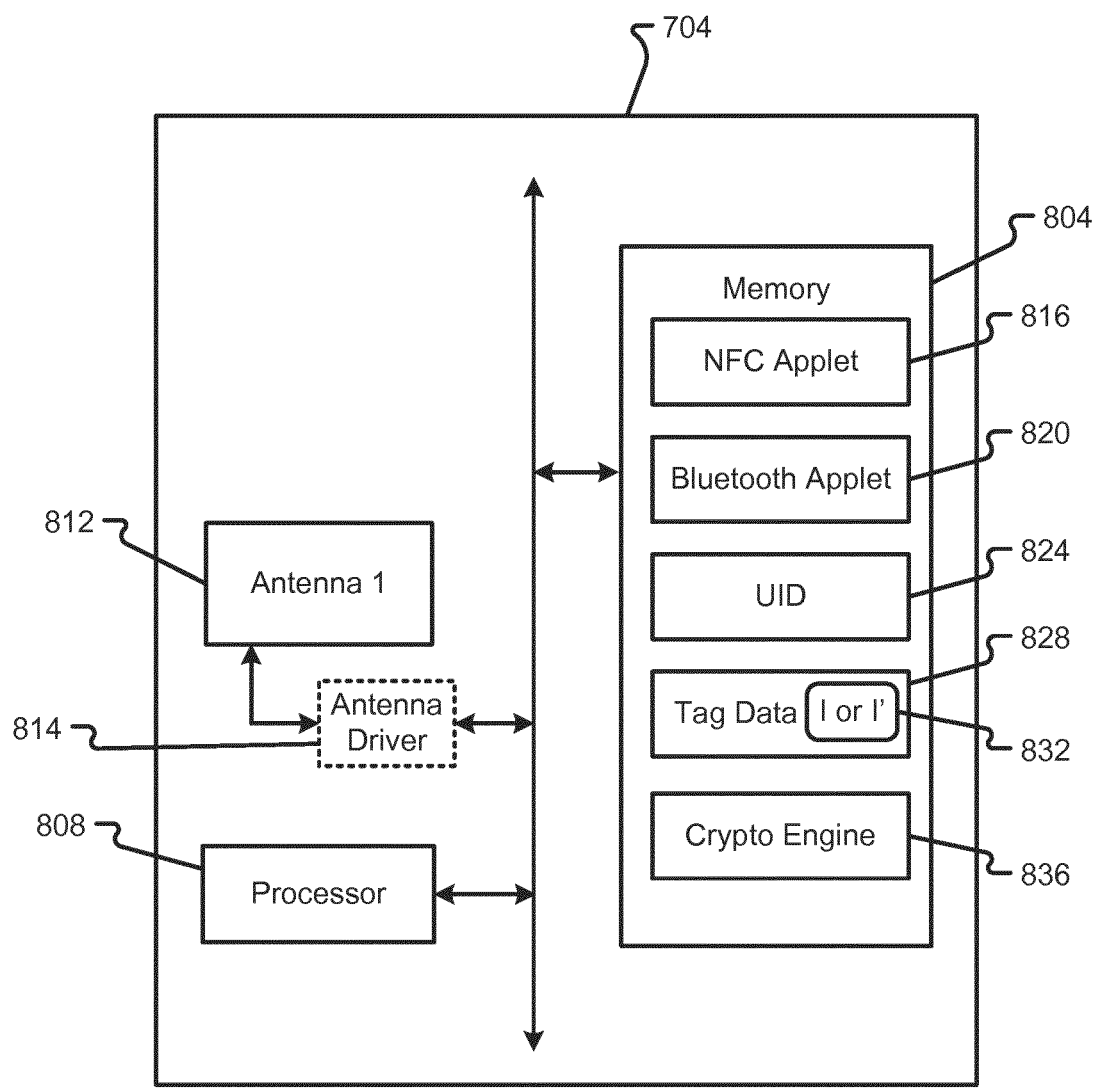
FIG. 8 is a block diagram depicting details of a trusted tag in accordance with at least some embodiments of the present disclosure.

With reference now to FIG. 8, additional details of a tag 704 will be described in accordance with at least some embodiments of the present disclosure. The tag 704 is shown to include memory 804, a processor 808, an antenna 812, and an optional driver 814 for the antenna 812. In some embodiments, the memory 804 may correspond to volatile or non-volatile memory similar to other memory devices depicted and described herein. Even more specifically, memory 804 may correspond to a secure memory location of an Integrated Circuit (IC). In such an embodiment, the tag 704 may correspond to an Integrated Circuit Card (ICC).

In some embodiments, the processor 808 may correspond to a plurality of processors, each configured to perform certain operations for the tag 704. The processor 808 may correspond to a microprocessor, Central Processing Unit (CPU), collection of processors or CPUs, or the like. In some embodiments, the processor 808 may be configured to execute instructions stored in memory 804, thereby providing functionality to the tag 704.

The memory 804 may comprise a number of modules or instruction sets (e.g., applications, drivers, etc.) stored therein. Data may also be stored in memory 804. As some non-limiting examples, the memory 804 may include an NFC applet 816, a Bluetooth or BLE applet 820, and a cryptographic engine 836. The memory 804 may also store a UID 824, other tag data 828. In some embodiments, the tag data 828 may include some portions of the user˜s identity I or I˜. In some embodiments, the tag data 828 may include data that is used to retrieve the user˜s identity I or I˜ from the distributed ledger 624 (e.g., encryption keys, block identifiers, signatures, etc.).

The NFC applet 816 may comprise instructions that, when executed by the processor 808, enable the NFC functionality of the tag 704. For instance, the NFC applet 816 may be responsible for causing the tag 704 to operate in a card emulation mode, a read/write mode, and/or a peer-to-peer mode. The NFC applet 816 may also correspond to a specific portion of memory where sensitive data normally communicated via NFC (e.g., key(s), encryption algorithms, other transaction data, etc.) is securely stored on the tag 704. Alternatively or additionally, the NFC applet 816 may be replaced with or supplemented with a Bluetooth applet 820 or UWB applet that enables the tag 704 to communicate with other devices (e.g., the mobile communication device 104) via Bluetooth or UWB, respectively. It should be appreciated that the tag 704 may be equipped for Bluetooth, NFC, and/or UWB communications. In some embodiments, the Bluetooth communications, NFC communications, and/or UWB communications may occur via the antenna 812.

When executed, the NFC applet 816, Bluetooth applet 820, or UWB applet, for example, may cause the processor 808 to exchange information with other devices according to known NFC, Bluetooth, or UWB protocols via the antenna 812. Where NFC is employed, the NFC applet 816 may utilize the antenna 812 as a coil or antenna that inductively couples with other RF-enabled devices.

The UID 824 may correspond to a unique identifier assigned to the tag 704. The tag data 828, as compared to the UID 824, may include additional information written specifically to the tag 704. In some embodiments, the tag data 828 may include a URL or a location of the user˜s identity I or I˜ may be referenced by a URL. The cryptographic engine 836 may be configured to cryptographically secure communications between the tag 704 and the mobile communication device 104. In some embodiments, the cryptographic engine 836 may be used to apply private or public encryption keys to any data communicated by the tag 704. The cryptographic engine 836 may also be configured to store or share any cryptographic keys that were used to securely write the user˜s identity I or I˜ onto the distributed ledger 624.

Figure 9:
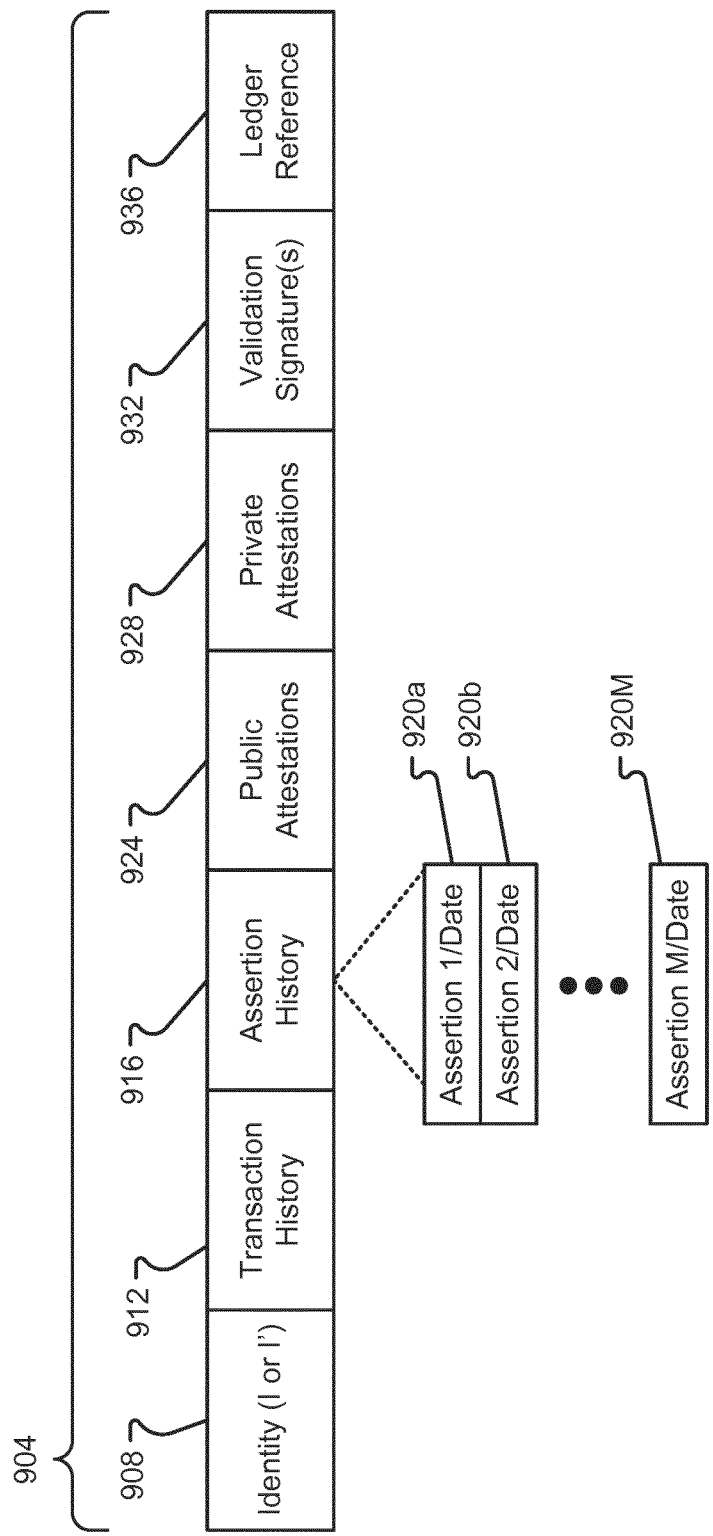
FIG. 9 is a block diagram depicting details of a data structure in accordance with at least some embodiments of the present disclosure.

With reference now to FIG. 9, additional details of a data entry 904 in a distributed ledger 624 will be described in accordance with at least some embodiments of the present disclosure. It should be appreciated that the data entry 904 may also be stored in any type of data structure and does not necessarily have to be stored as a block or set of blocks in a distributed ledger. For instance, the data entry 904 may correspond to one or more data fields stored in a centralized database rather than being stored across a number of different memory devices in the form of a distributed ledger 624. Some of all of the data entry 904 may be stored as part of a user˜s identity I or I˜ and may be managed by the identity server 112 as described herein.

Figure 10:
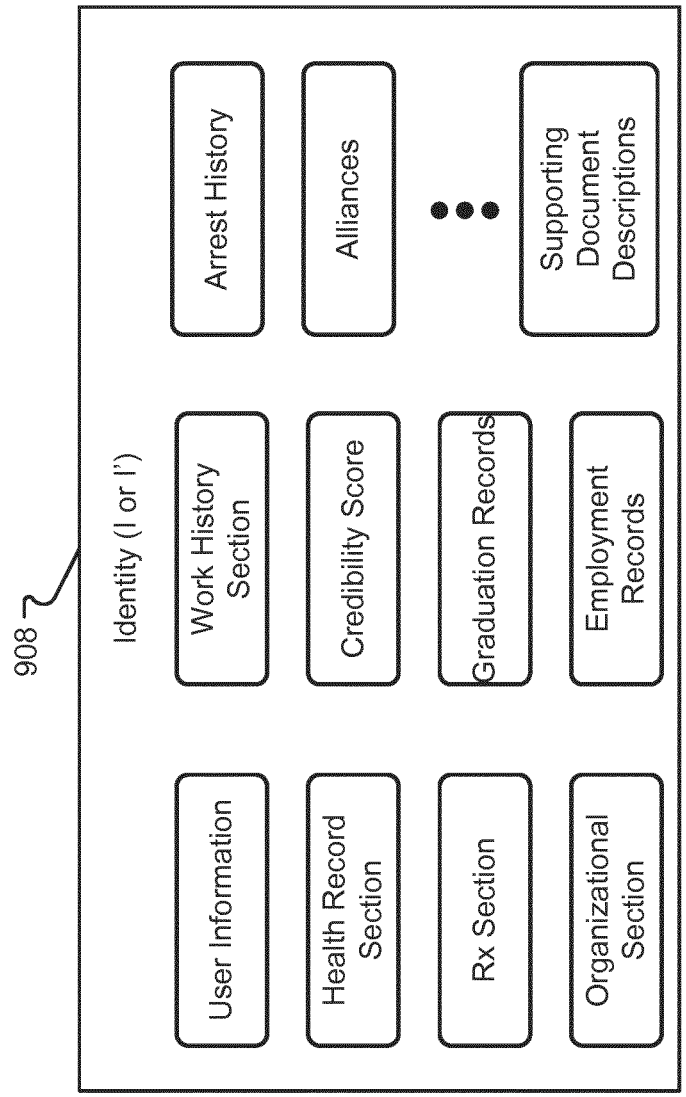
FIG. 10 is a block diagram depicting details of an identity in accordance with at least some embodiments of the present disclosure.

The types of information that may be stored in the data entry 904 include, without limitation, identity information 708 (e.g., I or I˜), transaction history 912, assertion history 916, public attestations 924, private attestations 928, validation signatures 932, and/or ledger references 936. The identity field 908, as shown in FIG. 10, may include user 124 information (e.g., name, date of birth, social security numbers, passport numbers, aliases, nicknames, usernames, etc.), health records for the user (e.g., descriptions of health providers, references to health transcriptions or other databases that store the user˜s health records, identifiers that uniquely identify the user 124 in a heath care database, etc.), prescription information or history for the user 124, organizational section (e.g., a listing of organizations with which the user 124 has been or is still affiliated with), a work history section (e.g., a section that lists previous or current employers of the user 124), a credibility score (e.g., a numerical value assigned to the identity I or I˜ that describes the confidence with which the user˜s identity I or I˜ is associated based on data used to generate or augment the identity I or I˜), graduation records, employment records, an arrest history, alliances, and supporting identity documents D that were used to create the user˜s identity I or I˜.

The transaction history 912 may describe the transactions with which the user˜s identity I or I˜ has been associated. For instance, the transaction history 912 may be used to store information related to a number of times when a user˜s identity I or I˜ has been augmented. Alternatively or additionally, the transaction history 912 may be used to store information describing when the user˜s identity I or I˜ was created.

The assertion history 916, as compared to the transaction history 912, may correspond to a specific listing of assertion instances 920a-M. The assertion history 916 may indicate each instance 920 when the user˜s identity I or I˜ was asserted to another entity, such as the second user 128 or otherwise communicated to a reader 108. The assertion history 916 may describe the date, time, order, unique assertion identifier, or other circumstances surrounding an assertion of the user˜s identity I or I˜.

The public attestations section 924 may include any information related to public attestations made by another entity with respect to the user˜s identity I or I˜. Alternatively or additionally, the public attestations section 924 may be used to store information associated with the user˜s 124 public attestations provided to other user identities, organizational identities, etc. Compared to the public attestations 924, the private attestations section 928 may be used to store any information related to a private attestation made by another entity with respect to the user˜s identity I or I˜. Alternatively or additionally, the private attestations section 928 may be used to store information associated with the user˜s 124 private attestations provided to other user identities, organizational identities, etc. In some embodiments, the public attestations 924 may differ from private attestations in that details of the public attestation 924 are shareable by the user 124 as part of asserting their identity I or I˘ with another user 128 whereas details of the private attestations 928 are not shareable. The existence of both attestations 924, 928, may, however, be shareable with other users 128 or may at least be used to generate a credibility score for the user's identity I or I˘.

The validation signatures 932 may include any number of signatures used to validate data written to the entry 904 or added to the user's identity I or I˘. As is known in distributed ledger technologies, the validation signatures 932 may be provided by entities other than the user 124 and may be required before writing data onto the entry 904. The ledger reference 936 may include block identifiers or ledger entry identifiers of previous entries made to the distributed ledger 624. The combination of the validation signatures 932 and ledger references 936 may be used to ensure that each subsequent entry written to a user's identity I or I˘ is appropriately linked or references previous entries. In some embodiments, the validation signature(s) 932 may provide a proof on the distributed ledger 624 that an entry written thereto was validated prior to being written and the ledger reference 936 may include the reference to a previous entry in the distributed ledger 624 to ensure all entries made to the distributed ledger 624 represent an indelible record of entries.

With reference now to FIGS. 11 through 18, various methods of building, managing, and using a user's identity I or I˘ will be described in accordance with at least some embodiments of the present disclosure. Any one of the methods or steps depicted and described herein can be combined with any other method or method steps without departing from the scope of the present disclosure.

Figure 11:
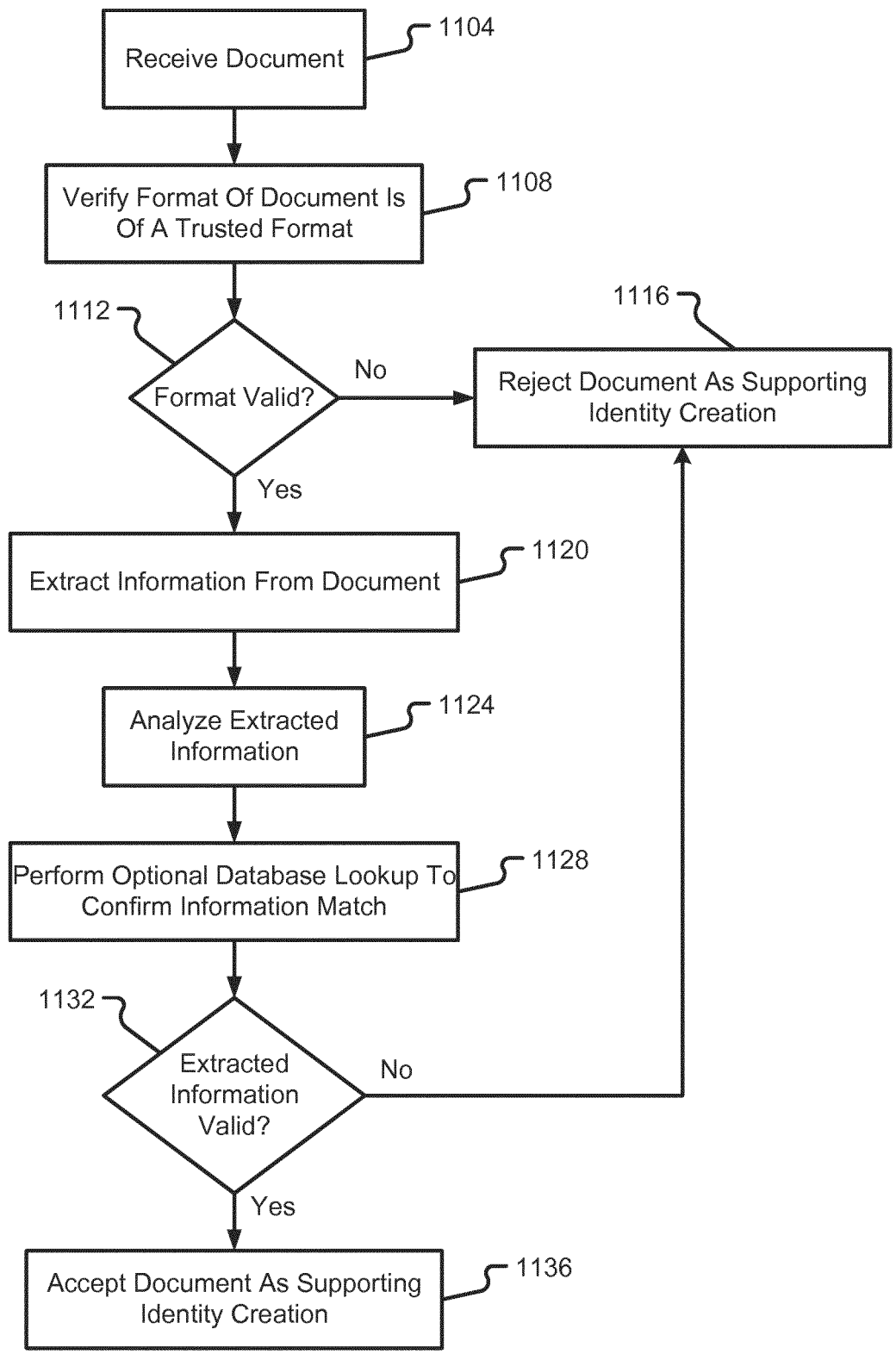
FIG. 11 is a flow diagram depicting a method of validating documents to support identity creation in accordance with at least some embodiments of the present disclosure.

With reference initially to FIG. 11, a method of ingesting and determining whether to accept particular identity documents D as part of building a user's identity will be described in accordance with at least some embodiments of the present disclosure. The method begins when an identity document D is received at the identity building engine 220 (step 1104). The identity building engine 220 first verifies the format of the document (step 1108) and ensures that the format of the document corresponds to a valid format for the type of document being presented to the identity building engine 220 (step 1112). In some embodiments, this verification step may include analyzing the identity document D for any known or required security features. This verification step may also include referring to an external database for format requirements associated with the identity document D and any other information that an entity which is purported to have issued the identity document D can provide to the identity building engine 220.

If the identity document D is determined to fail the validation step, then the document is rejected and will not support the creation of the user's identity I or I˘ (step 1116). The method may end here or the user that presented the identity document D may be notified of the validation failure and may be requested to re-present the identity document D or some other identity document D.

If the validation step is passed, then the method continues with the identity building engine 220 extracting some or all of the information presented by the identity document D (step 1120). In some embodiments, images may be taken of the identity document D. Alternatively or additionally, optical character recognition may be applied to the identity document D to extract the various textual portions of the identity document D and then user images may be extracted separately from the textual portions of the identity document D. Any portion of the identity document D may be extracted and analyzed to help build the user's identity (step 1124). In some embodiments, the information that is extracted from the identity document D may be cross-referenced with other information for the user that has already been stored in a separate database (step 1128). For instance, if the identity document D corresponds to a driver's license issued by the state of Texas, then the identity building engine 220 may extract the user's photo, name, and date of birth from the identity document D at step 1120, analyze the extracted information to ensure that the extracted information is in a valid format in step 1124, and then perform a database query to the state of Texas Department of Motor Vehicles to determine if the information extracted from the identity document D matches the information stored for the user by the state of Texas Department of Motor Vehicles in step 1128.

At step 1132, the identity building engine 220 will then determine if the extracted information is valid based on the processes performed in steps 1120, 1124, and 1128. If the extracted information is not determined to be valid, then the method proceeds to step 1116 and the identity document D is rejected as supporting identity creation for the user 124. However, if the validation of the extracted information is confirmed, then the identity document D may be accepted as supporting identity creation for the user 124 (step 1136).

Figure 12:
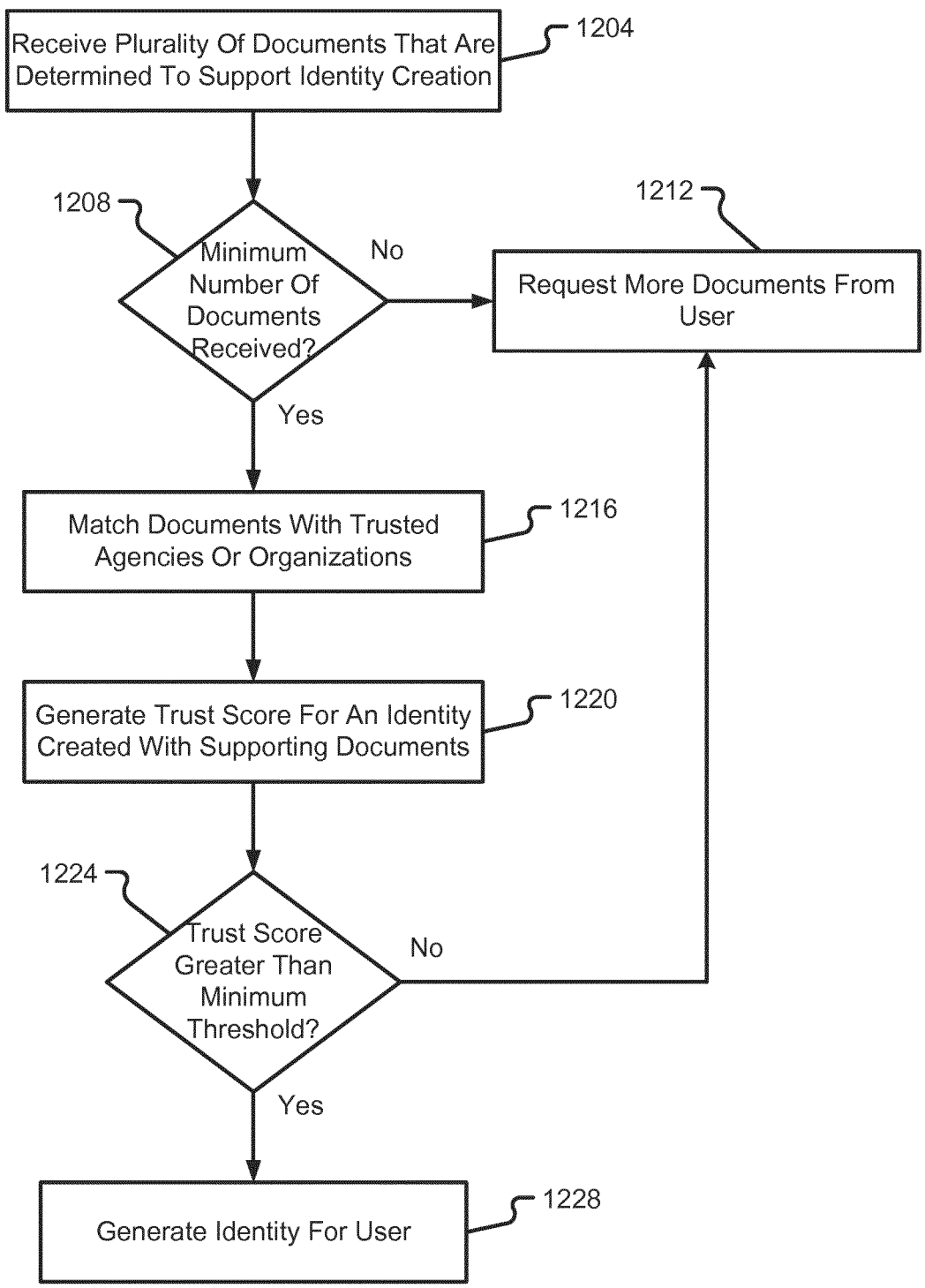
FIG. 12 is a flow diagram depicting a method of generating an identity for a user in accordance with at least some embodiments of the present disclosure.

With reference now to FIG. 12, a method of generating an identity I for a user 124 will be described in accordance with at least some embodiments of the present disclosure. The method begins by receiving a plurality of identity documents that are determined to support identity creation for the user 124 (step 1204). In some embodiments, the method of FIG. 11 may need to be performed a predetermined number of times at least until a predetermined number of valid identity documents D are received at the identity building engine 220. While it may be possible to build a user's identity I based on a single identity document D, embodiments of the present disclosure contemplate that any useable or reliable identity may require more than one identity document D to support the creation of an identity I. It should be appreciated however, that if a particular type of identity document D is received and confirmed as valid to support identity creation, then it may be possible to begin the process of FIG. 12 with a single identity document D rather than a plurality of identity documents D. The decision to proceed with a single identity document D rather than a plurality may be based on the amount of information provided within a particular document and/or a reliability associated with the entity that issued the identity document D.

The method continues with the identity building engine 220 determining whether a required minimum number of valid identity documents D have been received and ingested (step 1208). As mentioned above, this minimum number may correspond to a predetermined and hardcoded value. Alternatively, the minimum number may depend upon the strength or trust level associated with the received identity documents D. Thus, a set of two identity documents D issued by highly-trusted entities may satisfy the minimum requirement of step 1208 whereas another set of identity documents D not issued by the same highly-trusted entities may have a minimum requirement of three or more identity documents.

If the minimum number of identity documents D has not been satisfied, then the identity building engine 220 may request more identity documents from the user 124 (step 1212). Once the mini mum number of identity documents D have been received, the method may continue with the identity building engine 220 matching the documents D with trusted agencies or organizations (step 1216) and then generating a trust score for the identity that will be built based on the identity documents D (step 1220). If the trust score does not at least meet a minimum trust score (step 1224), then the identity building engine 220 may require the user 124 to provide more identity documents before an identity is finalized and issued (step 1212). As can be appreciated, the trust score generated in step 1220 may depend upon the number of identity documents D, the trust level associated with the issuing entities of the identity documents D, the amount of information successfully extracted from the identity documents D, the amount of data from the different identity documents D that is consistent across the different identity documents D, and other factors.

Once the minimum trust score is reached, the method may then continue with the identity building engine 220 generating an identity I for the user 124 (step 1228). In some embodiments, the identity I for the user may output by the identity building engine 220 and transferred along to some other component of the identity server 112.

Figure 13:
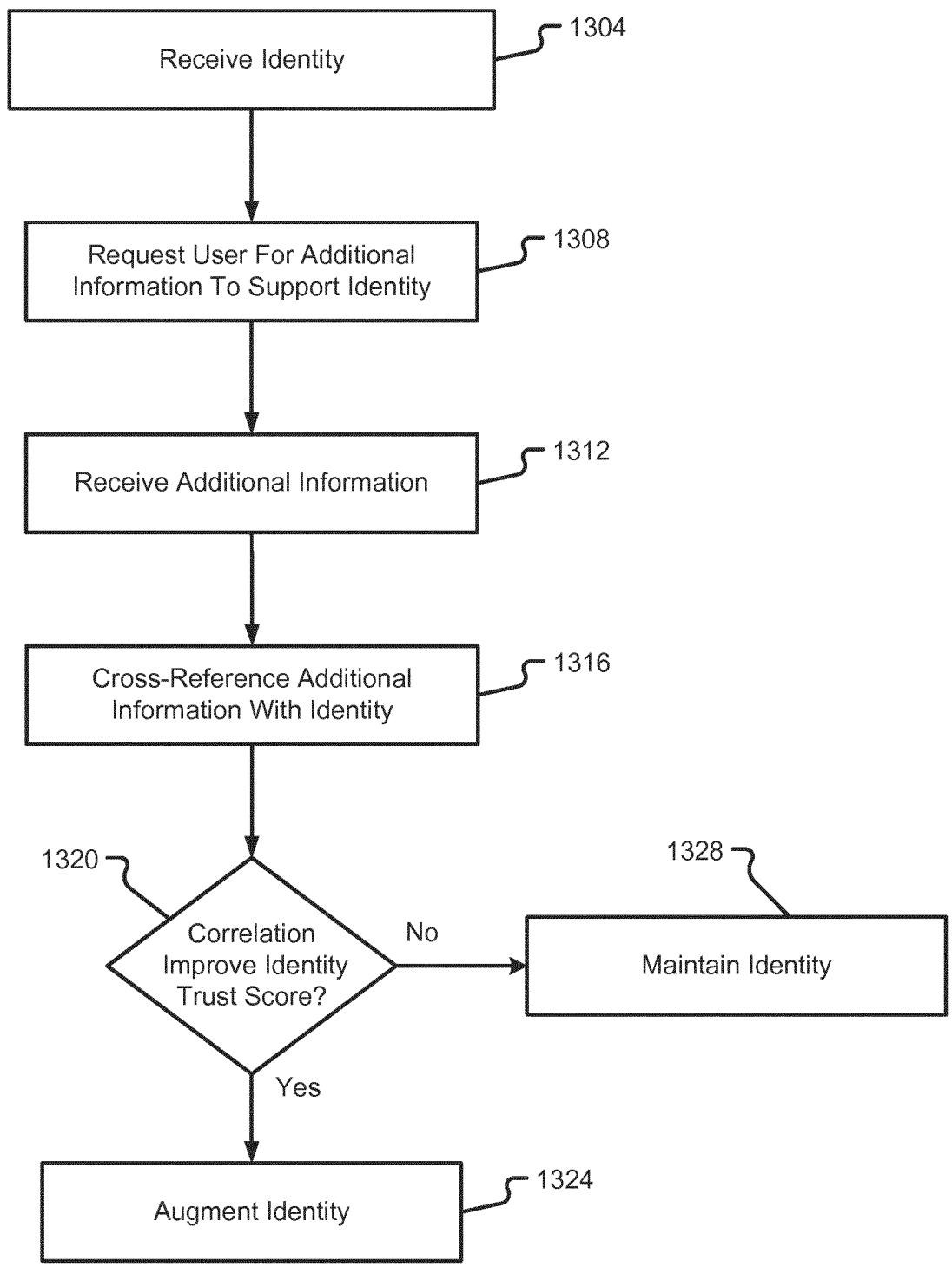
FIG. 13 is a flow diagram depicting a method of augmenting an identity in accordance with at least some embodiments of the present disclosure.

With reference now to FIG. 13, a method of augmenting or updating a user's identity I into an augmented identity I˜ will be described in accordance with at least some embodiments of the present disclosure. The method begins when an identity I is received at the identity augmentation engine 224 (step 1304). The identity augmentation engine 224 may then request additional information from the user 124 that is associated with the identity I (step 1308). The user 124 may then provide the additional information either by providing one or more user inputs or image inputs to the identity augmentation engine 224 (step 1312). In some embodiments, the user 124 may be requested for a current or immediately-current image. In this situation, the user 124 may utilize their mobile communication device 104 to capture an image of themselves and the image may provided to the identity augmentation engine 224 via the image inputs 520. In some embodiments, the user 124 may be requested to provide additional proof of residence to support the creation or augmentation of their identity. The user may provide the identity augmentation engine 224 with information related to their utility service provider, Internet service provider, large intersections nearby the residence, or any other information that would be readily available and known to a user that actually lives at the residence the user 124 is asserting they live at. The responses to any such proof of residence request may be provided to the identity augmentation engine 224 via the user inputs 524.

The identity augmentation engine 224 may receive the additional information and then cross-reference the received information with the identity I received in step 1304 (step 1316). The identity augmentation engine 224 may also check one or more external databases to ensure that the information received from the user 124 matches particular formats for that data and/or to ensure that the information provided by the user is accurate or likely to be accurate. In some embodiments, if the user provides a current image of themselves, the identity augmentation engine 224 may compare the current image of the user against any images extracted from the identity documents D used during the creation of the identity I to ensure that the images match one another, at least within some statistical certainty. Failure of the current image to match any of the other images extracted from the identity documents D may indicate that the user is not the user associated with the identity I or at least that the identity I should not be augmented or updated based on the currently-provided information.

Thus, the method will continue with the identity augmentation engine 224 determining whether or not the additional information provided results in a correlation that can improve the identity I (step 1320). More specifically, in some embodiments, the identity augmentation engine 224 may determine if the identity trust score associated with the identity I can be improved based on the newly-received information. If this query is answered negatively, then the identity received in step 1304 is maintained as the identity I for the user 124 (step 1328). On the other hand, if the query of step 1320 is answered positively, then the identity augmentation engine 224 may augment the user's identity I to create an augmented identity I˜ (step 1324). Updates or augmentations to the user's identity I may be effected by writing one or more additional blocks or entries into the distributed ledger 624, possibly with reference or a pointer to the previous entry or block that stored the user's identity I. Such additional blocks or entries may require a validation and signature prior to being written to the distributed ledger as an electronic record.

Figure 14:
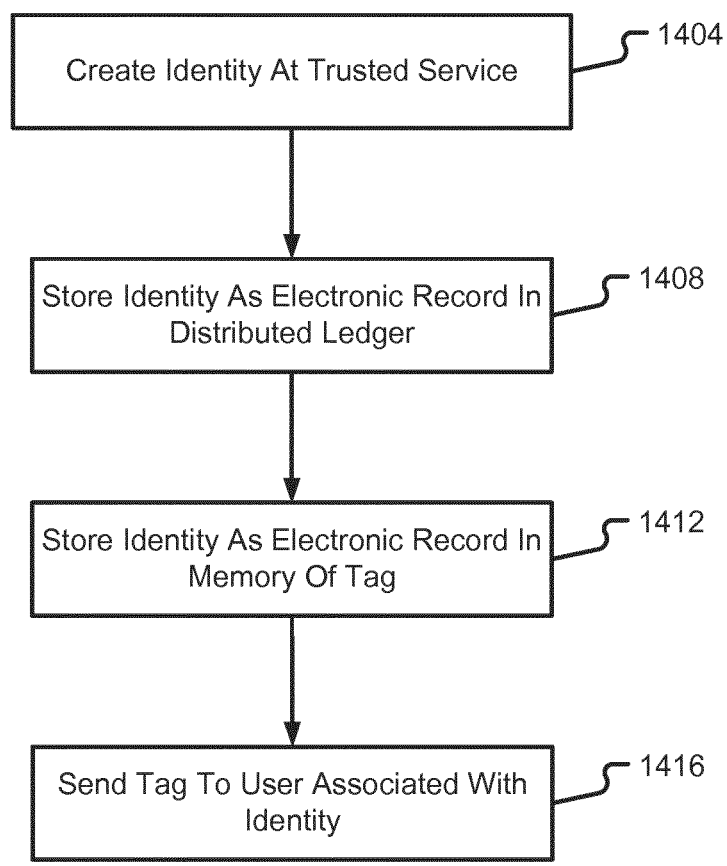
FIG. 14 is a flow diagram depicting a method of generating and storing identity information in accordance with at least some embodiments of the present disclosure.

With reference now to FIG. 14, a method of distributing a tag 704 in connection with delivering a user identity will be described in accordance with at least some embodiments of the present disclosure. The method begins when an identity I or I˜ is created at the identity server 112 (step 1404). The identity I or I˜ may be created by a trusted service that owns and operates the identity server(s) 112 or the identity I or I˜ may be created at the identity server(s) 112 and then communicated over the communication network 116 to a trusted service provider.

The method continues by storing the identity I or I˜ or at least some information associated therewith as one or more entries in a distributed ledger 624 (step 1408). In some embodiments, the identity I or I˜ and any number of other data fields of an entry 904, such as those depicted and described in FIG. 9, may be stored within a single entry or as multiple entries in the distributed ledger 624. In some embodiments, the identity I or I˜ may be stored as multiple entries with references to one another. Although it may be useful and desirable to store the identity I or I˜ and other associated information in a distributed ledger 624 and, therefore, among one or a plurality of different data storage devices, embodiments of the present disclosure also contemplate storing some or all of a user's identity I or I˜ in a centralized/hierarchical database, such as a SQL database or the like.

The method may further continue with the identity storage engine 228 completing the writing of the identity I or I˜ to the distributed ledger 624 and then providing an output to another component in the server 112 that controls the distribution of the identity to the user 124 whose identity I or I˜ has just been stored. In some embodiments, the method may continue by storing the identity I or I˜ or at least some information associated therewith (e.g., encryption keys, block identifiers, distributed ledger identifiers, data formatting instructions, etc.) onto memory of the tag 704 (step 1412). The entity that prepares the tag 704 may or may not correspond to the same entity that built and manages the user's 124 identity I or I˜.

Once the appropriate information is stored onto the memory of the tag 704, the method continues by distributing the tag 704 to the user 124 for whom the identity I or I˜ was built (step 1416). In some embodiments, the tag 704 may be physically delivered to the user 124 via mail, post, courier, or the like. It may also be possible to protect the information stored on the tag 704 by securing the information with an additional password that is communicated to the user 124 via an alternate communication channel than is used to deliver the tag 704. Possible examples of such alternate communication channels include, without limitation, email, text, phone call, etc.

Figure 15:
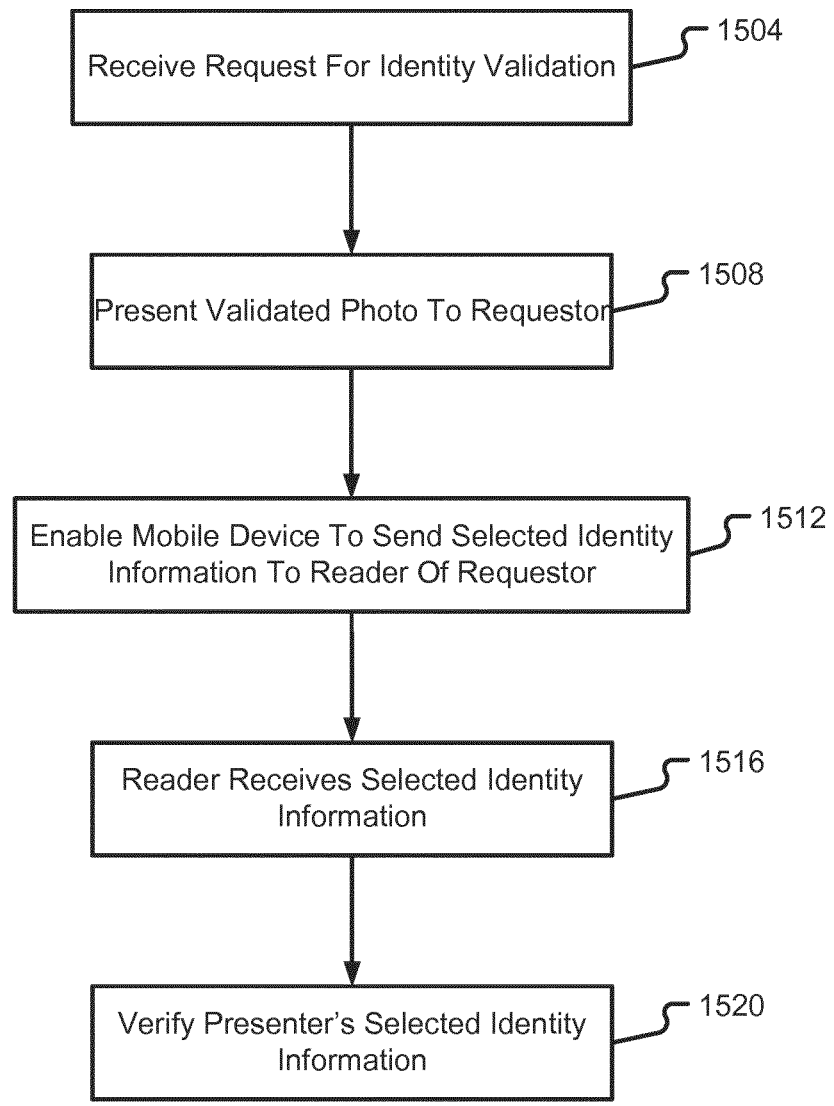
FIG. 15 is a flow diagram depicting a method of verifying identity information in accordance with at least some embodiments of the present disclosure.

With reference now to FIG. 15, a method of using an identity I or I˜ will be described in accordance with at least some embodiments of the present disclosure. The method may be performed in any instance where a user 124 desires to share or have at least some identity information validated by another user 128. Any instance where one user 128 has to rely on at least some information for the user 124 to perform a task or complete a transaction may qualify as the type of use instance described herein.

The method begins when the user 124 receives a request for identity validation (step 1504). In some embodiments, the request for identity validation may be communicated to the first user 124 verbally by the second user 128 (e.g., 'show me your identification_ or 'I need to verify your age_). In some embodiments, the request for identity validation may be communicated to the mobile communication device 104 by the reader 108 and, in some embodiments, the request may correspond to an initiation of a communication session between the mobile communication device 104 and reader 108 rather than corresponding to an affirmative request or discrete message sent to the mobile communication device 104. As an example, if the mobile communication device 104 establishes a communication channel 120 with the reader 108, then the mobile communication device 104 may automatically follow a protocol to begin sharing some amount of the user˜s 124 identity I or I˜. As a more specific, but non-limiting example, the communication channel 120 may not automatically trigger the mobile communication device 104 to begin sharing the user˜s 124 identity I or I˜. Rather, the reader 108 may communicate a particular type of information required from the user˜s 124 identity I or I˜ (e.g., age, date of birth, citizenship, residence state, etc.) and that communication may correspond to a request for identity validation.

The method may continue with the user 124 presenting a validated photo to the user 128 that requested the identity validation (step 1508). In some embodiments, the user 124 may be asked to present a 'validated selfie_to the user 128 where the validated selfie corresponds to an image taken of the user 124 with the mobile communication device 104 that is no older than a predetermined age (e.g., a day old, a week old, a year old, etc.). The user 124 may simply show the second user 128 the display of their mobile communication device 104 as part of displaying their validated photo.

When the user 128 confirms the photo is a photo of the user 124 and that the photo qualifies as a validated photo (e.g., has an appropriate format and is not older than a predetermined age), the user 124 may then enable their mobile communication device 104 to send some amount of the user˜s 124 identity I or I˜ to the reader 108 (step 1512). In some embodiments, the user˜s 124 identity I or I˜ is communicated directly to the reader 108 by the mobile communication device 104 over the communication channel 120. In some embodiments, the mobile communication device 104 provides the reader 108 with information that allows the reader 108 to refer to the distributed ledger 624 and find the requested information from the user˜s identity I or I˜ stored in the distributed ledger 624. For instance, the mobile communication device 104 may provide the reader 108 with a block identifier and/or instructions for finding a block in the distributed ledger 624 that contains the requested identity information. The reader 108 may then be able to retrieve the information from the distributed ledger 624.

Thus, the user˜s 124 identity I or I˜ or information associated therewith may be communicated directly to the reader 108 or retrieved by the reader 108 with information that was provided to the reader 108 by the mobile communication device 104. The method continues when the reader 108 receives the requested identity I or I˜ or information associated therewith (step 1516). The user 128 may then refer to the reader 108 to verify the presenting user˜s 124 identity I or I˜ in addition to confirming that the photo of the user 124 was valid (step 1520). At this point, the user 128 may have sufficient information to trust that the user 124 is who they say they are and any type of interaction between the users 124 and 128 may ensue with an increased level of trust. For instance, the user 128 may now trust that the user 124 is who they assert themselves to be and may conduct a transaction or exchange of goods with the user 124.

Figure 16:
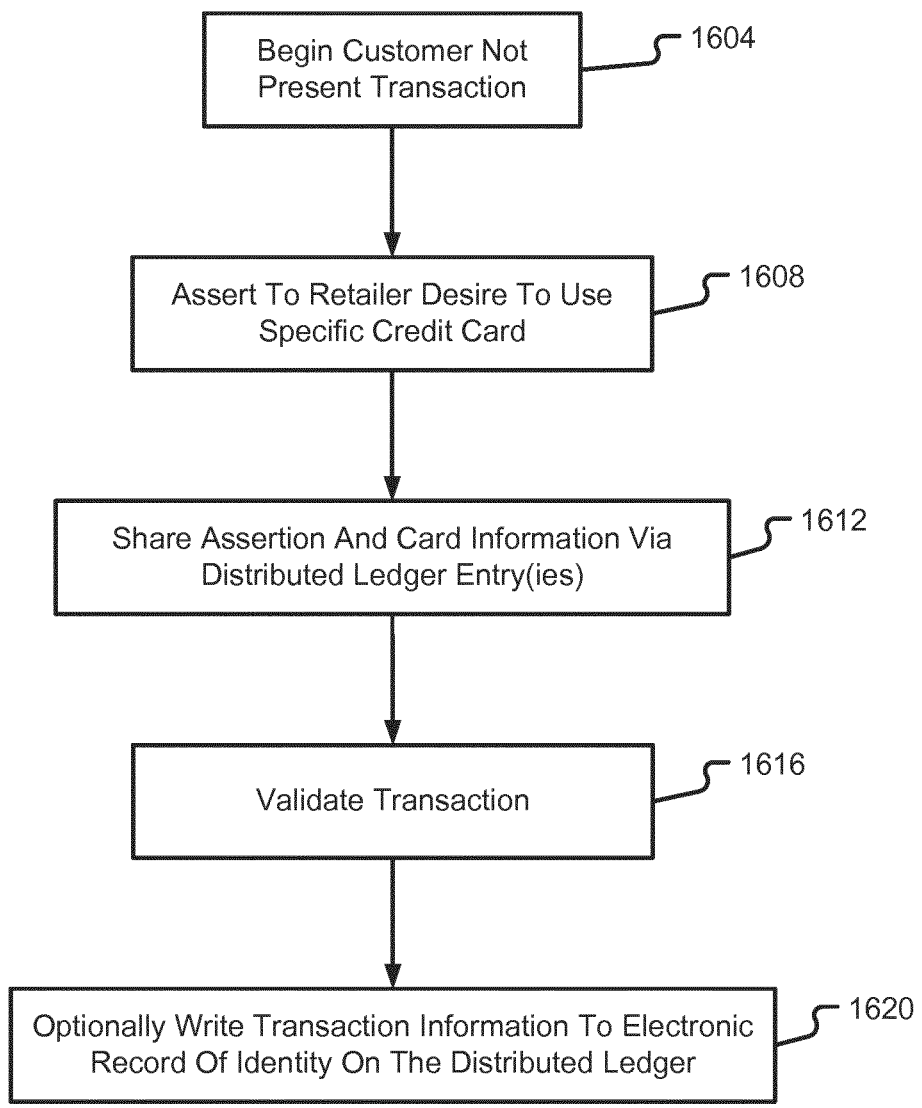
FIG. 16 is a flow diagram depicting a method of completing a transaction with shared identity information in accordance with at least some embodiments of the present disclosure.

With reference now to FIG. 16, a method of enabling a transaction between users 124 and 128 and then writing an electronic record to the distributed ledger 624 to describe the transaction will be described in accordance with at least some embodiments of the present disclosure. The method may correspond to a method of facilitating a Customer Not Present (CNP) transaction between the user 124 and user 128 (step 1604). In some embodiments, the CNP transaction may be performed between the user 124 and user 128 over the communication network 116 (e.g., as a web-based transaction).

The method continues with the user 124 asserting to the retailer (which may correspond to user 128) the desire to use a specific credit card (step 1608). The retailer may require some level of identity assertion by the user 124 in connection with completing the transaction. Thus, the retailer may request some or all of the user˜s 124 identity I or I˜ (step 1612). The user 124 may respond by directly providing the requested identity I or I˜ or information associated therewith to the retailer (e.g., by sending one or more secure/encryption-protected packets) to the retailer˜s server. Alternatively or additionally, the user 124 may share information with the retailer˜s server that enables the server to reference the distributed ledger 624 and verify the user˜s 124 identity I or I˜ or specific information associated therewith.

After the retailer receives the user˜s 124 identity I or I˜ or information associated therewith, the retailer can confirm the validity of the user˜s 124 identity I or I˜ and then determine that an increased level of trust is created for the user 124. This increase level of trust may enable the retailer to validate the CNP transaction without the risks usually associated with such transactions (step 1616). The method may further continue with the retailer writing some description of the transaction to the user˜s 124 identity I or I˜ (step 1620). For instance, the retailer may write a new block to the distributed ledger 624 that refers to one or more blocks that store an electronic record of the user˜s 124 identity I or I˜. This enables the transaction information to be indelibly stored in the distributed ledger 624 with an association to the user˜s 124 identity I or I˜. In some embodiments, the transaction information may become part of the user˜s identity I or I˜ or at least contribute to increasing a confidence score associated with the user˜s identity I or I˜.

Figure 17:
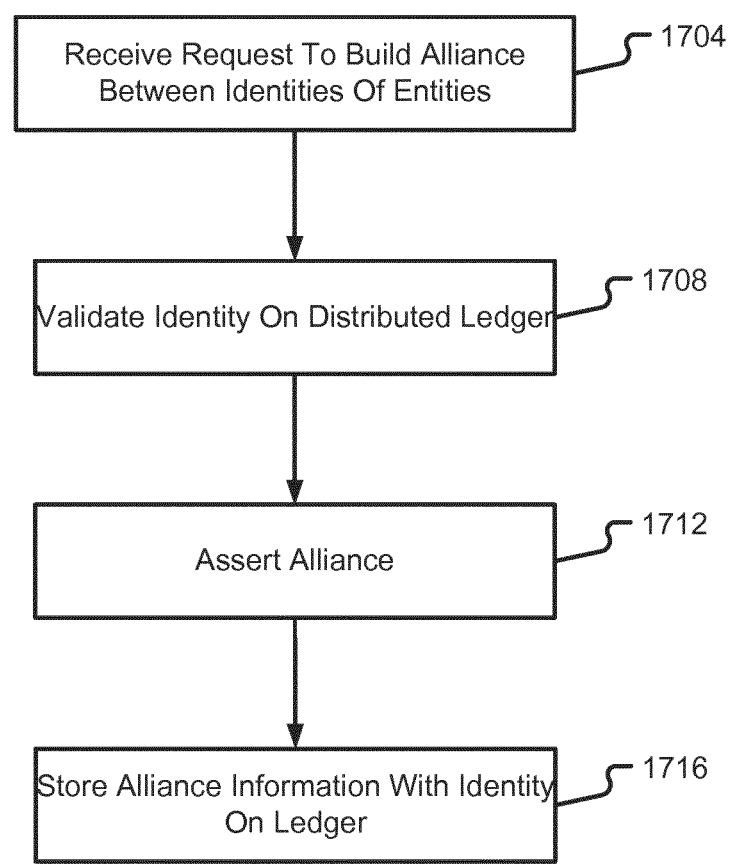
FIG. 17 is a flow diagram depicting details of creating alliances in accordance with at least some embodiments of the present disclosure.

With reference now to FIG. 17, a method of creating alliances between entities with use of an identity I or I˜ will be described in accordance with at least some embodiments of the present disclosure. The method begins when a request is received at one entity to build or create an alliance with another entity (step 1704). In some embodiments, entities that have an identity I or I˜ may correspond to individual persons (e.g., citizens). In some embodiments, an organization may have an identity I or I˜. Thus, either user 124 or user 128 may correspond to an organization or collection of individual persons. As a non-limiting example, a corporation may be enabled to build and maintain an identity I or I˜ similarly or identically to the way that a user 124 can build a personal identity I or I˜. A corporation may be enabled to build an identity through use of identity documents D like articles of incorporation, corporate registrations with a state, registrations with other entities (e.g., stock markets), etc. Thus, as described herein, one entity may associate with another entity and each entity may correspond to a person, a corporation, or some other organization. Alliances can be built between an individual person and another individual person (e.g., to prove some level of relationship between the persons), between an individual person and an organization (e.g., to prove the individual person has a relationship with the organization), or between organizations (e.g., to prove the organizations have a relationship with one another). In some embodiments, the alliances built between entities may be stored as part of each entity's identity I or I˜ and may be made available to other entities for verification of the identity I or I˜ or verification of the alliance between entities (e.g., to enable proof that one entity has an alliance with another entity). The number and level of alliances may help to increase a credibility score associated with each entity's identity I or I˜.

The method will continue with the entity that received the request for the alliance referring to the distributed ledger 624 to validate the identity I or I˜ of the requesting entity (step 1708). In some embodiments, the reference to the distributed ledger 624 may be performed to ensure that the entity has an identity I or I˜ or some information from the identity I or I˜ may be requested and examined by the recipient of the alliance request. Once the validity of the requesting entity's identity I or I˜ is verified, the method continues by enabling the alliance between the entities (step 1712). In some embodiments, the alliance may be represented at identities I or I˜ of both entities by storing the alliance information onto the distributed ledger 624 with some reference to one or both identities I or I˜ (step 1716). An alliance may correspond to a stronger linking between identities I or I˜ than an attestation, which may correspond to a simple statement stored on the distributed ledger 624 that one entity can make for another entity. An alliance may correspond to an electronic record stored on the distributed ledger 624 that not only describes a relationship between two entities and their identities I or I˜, but also asserts that interactions between the entities is cooperative and may even include details of the interactions between entities. An assertion, on the other hand, may simply correspond to an affirmation made by one entity that another entity's entry of information in their identity I or I˜ is valid or confirmed.

Figure 18:
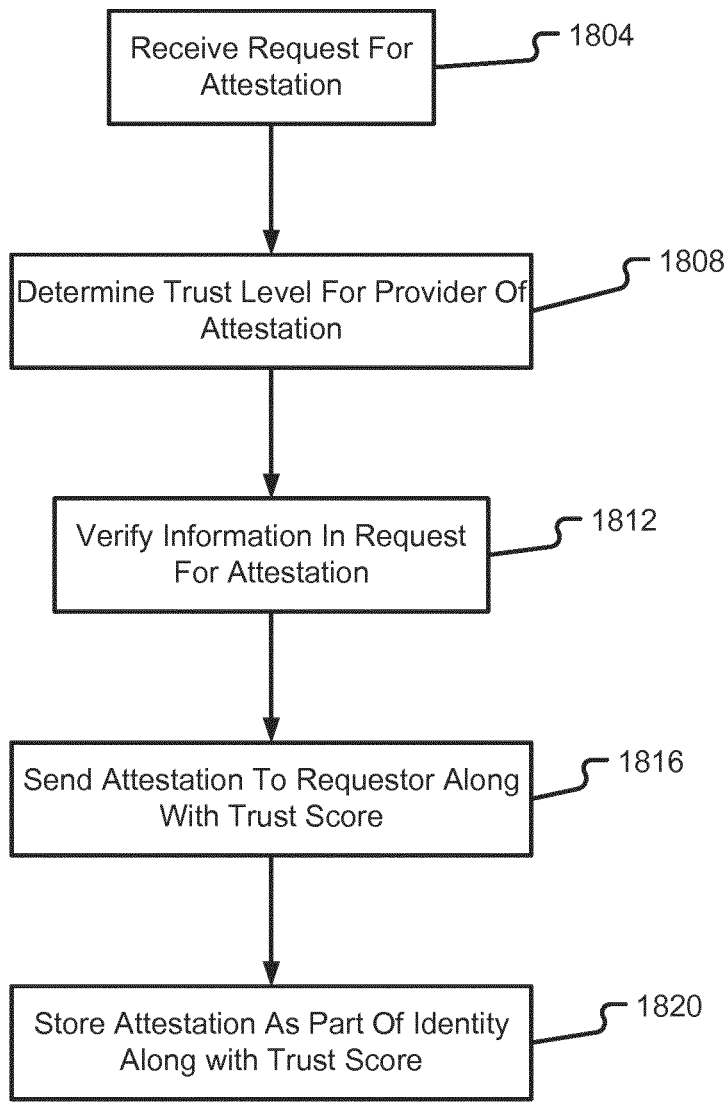
FIG. 18 is a flow diagram depicting details of processing identity attestations in accordance with at least some embodiments of the present disclosure.

With reference now to FIG. 18, a method of enabling attestations between entities will be described in accordance with at least some embodiments of the present disclosure. The method begins with one entity (e.g., an attesting entity) receiving a request for attestation from another entity (e.g., a requesting entity) (step 1804). The request for attestation may be communicated over the network 116 via one or more data packets.

The method may continue with the attesting entity referencing the electronic record of the requesting entity's identity I or I˜ on the distributed ledger 624 to determine whether particular information within the electronic record of the requesting entity's identity I or I˜ correlates with electronic records maintained at the attesting entity for the requesting entity (steps 1808 and 1812). As an example, the attesting entity may correspond to a university or place of employment that the requesting entity has included in their identity I or I˜ and would like to receive an attestation for the entry of such information in their identity I or I˜. The attesting entity may refer to their internal databases to determine if the requesting entity did, in fact, attend or work at the attesting entity and may further compare details of the information stored in the identity I or I˜ with information stored in the internal databases of the attesting entity. This comparison may result in the attesting entity determining a trust level for the attestation.

The method continues with the attesting entity sending the attestation to the requesting entity along with the trust score (step 1816). In some embodiments, the attestation may be sent directly to the requesting entity so that the requesting entity can store the attestation with some sort of signature or verification provided by the attestation entity. In some embodiments, the attestation entity may write the attestation directly to the distributed ledger 624 with a reference to the electronic record of the requesting entity's identity I or I˜ (step 1820). In either scenario, the attestation may be stored as part of the requesting entity's identity I or I˜ so that it can be later referenced by other entities. As can be appreciated, the attestation may be written as either a public or private attestation, depending upon the desires of the attesting entity and/or requesting entity.

Figure 19:
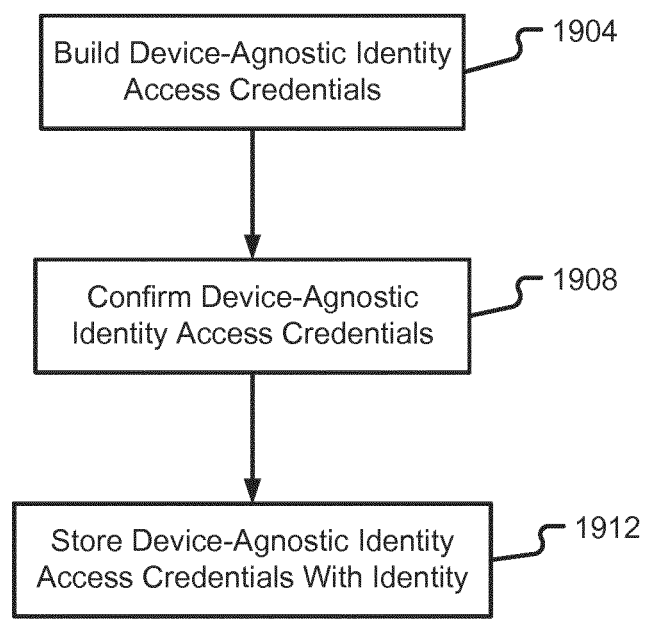
FIG. 19 is a flow diagram depicting a method of building and storing device-agnostic identity access credentials in accordance with at least some embodiments of the present disclosure.

With reference now to FIG. 19, a method of building and storing device-agnostic identity access credentials will be described in accordance with at least some embodiments of the present disclosure. As discussed, a user 124 may be allowed to access their identity I or I˜ from a trusted mobile communication device 104. Embodiments of the present disclosure may also enable the user 124 to seamlessly access their identity I or I˜ from a device other than a mobile communication device 104 that is known to have an association with the user 124. For example, embodiments of the present disclosure may enable the seamless access to be disconnected from the user's 124 personal mobile communication device 104. While a personal mobile communication device 104 may provide such seamless access through a trusted application, through use of digital credentials, passwords, biometric sign-on, etc., there may be instances where it is desirable to enable the user 124 to access their identity I or I˜ from any suitably equipped communication device.

The method to enable such a feature begins with the user 124 building one or more device-agnostic identity access credentials (step 1904). In some embodiments, device-agnostic identity access credentials may correspond to one or more pieces of information (e.g., passphrase, voice sample, sample image, security questions, etc.) that either describe the user 124, are known to the user 124 (e.g., as a secret), or are otherwise unique to the user 124. Part of building the identity access credentials may include performing multiple interactions with the user 124 at their trusted mobile communication device 104 where the necessary information is captured, possibly multiple times.

After the information is captured, the method may continue by playing back or presenting the information back to the user 124 (step 1908). This playback or re-presentation of the information may allow the user 124 to confirm the device-agnostic identity access credentials. The playback or re-presentation may occur at the user's 124 trusted mobile communication device 104 or via some other communication channel that does not pass through the user's 124 trusted mobile communication device 104.

Based on the playback or re-presentation of the information, the user 124 is allowed to confirm whether or not the credentials are accurate. If the user 124 confirms the information provided in step 1904 is accurate in step 1908, then the device-agnostic identity access credentials may be stored with the user's 124 identity I or I˜ (step 1912). In some embodiments, the information may be stored onto the distributed ledger 624 as a validated entry that references or points to another entry storing the user's 124 identity I or I˜. Once stored, the device-agnostic identity access credentials can be used by the user 124 to access their identity I or I˜ from any communication device and not just their trusted mobile communication device 104.

Figure 20:
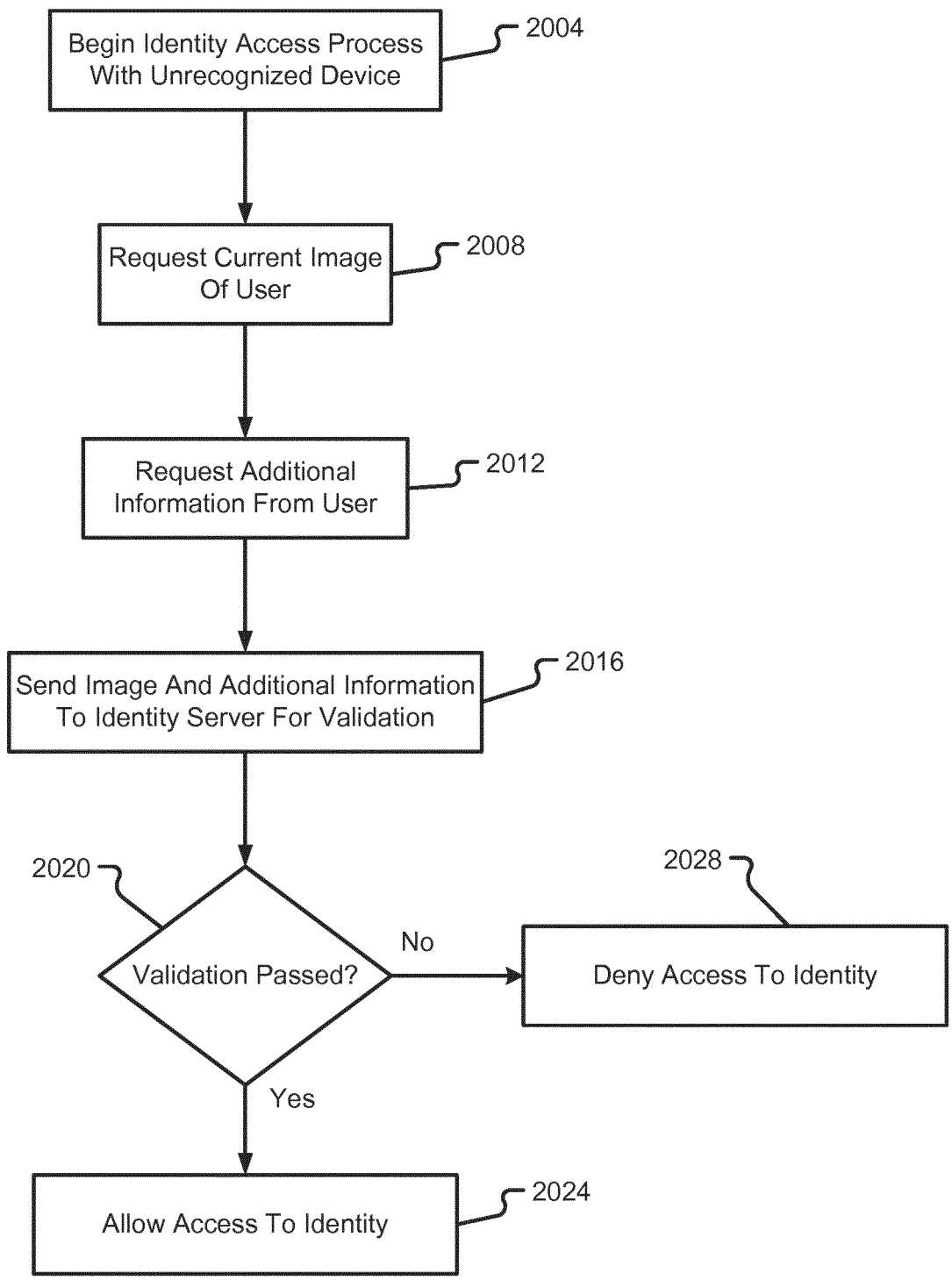
FIG. 20 is a flow diagram depicting a method of accessing an identity from an unrecognized device in accordance with at least some embodiments of the present disclosure.

With reference now to FIG. 20, a method of enabling a user 124 to access their identity I or I˜ from an unknown or untrusted communication device will be described in accordance with at least some embodiments of the present disclosure. The method begins when a user 124 attempts to access their identity I or I˜ using an unrecognized device (step 2004). The method may then continue by requesting a current image of the user 124 (step 2008). In some embodiments, the current image of the user 124 may be obtained in real-time (e.g., after the request is submitted to the user 124) using an image capture device of the unrecognized device. The capture image may include one or several still images and may or may not include timestamps to indicate when the image was captured because, in some embodiments, it may be desirable to require the image to be captured within a predetermined amount of time of the request being transmitted. In some embodiments, the capture image may correspond to one or multiple images obtained from a video stream.

The method further continues by requesting additional information from the user 124 (step 2012). The request for additional information may depend upon the type of information that is included in the user's 124 device-agnostic access credentials. For instance, if the user's 124 credentials include a passphrase, then the additional information requested from the user 124 may include a request for the passphrase.

The method may then continue with the unrecognized device sending the image and additional information to the identity server 112 for further analysis and validation (e.g., comparison against the stored device-agnostic identity access credentials for the user 124) (step 2016). The identity server 112 may then perform the appropriate comparison of the image against the stored image for the user 124, confirm a match exists between the recently-captured image and the stored image. The identity server 112 may also compare the additional information with the other information stored for the user's 124 device-agnostic identity access credentials. Based on these comparisons, the server 112 may determine whether the user 124 should be allowed to access the identity I or I˜ (step 2020). If the validation step results in a positive validation determination (e.g., the image comparison results in a positive determination of a match and the additional information comparison results in a positive determination of a match), then the user 124 will be allowed to access their identity I or I˜ via the unrecognized device (step 2024). On the other hand, if the validation process is not passed, then the user 124 is denied access to their identity I or I˜ (step 2028).

The above-described process may be particularly useful in scenarios where the user 124 wishes to share or link their identity I or I˜ with another person 128, but using the other person's 128 mobile device rather than the user's 124 trusted mobile communication device 104. For instance, two users may be involved in a car crash and desire to exchange insurance details with one another. The first driver (e.g., user 128) may load their identity I or I˜ information onto their mobile device and press a button indicating that the other driver (e.g., user 124) will also access their identity I or I˜ via the same device. The other driver (e.g., user 124) may look into the device and have an image captured thereby. The device may then request the other driver to speak their passphrase into the device. These two pieces of information may be provided back to the identity server 112, which assess the image and voiceprint to determine whether the device will be allowed to access the other drivers identity I or I˜. If both drivers have their identities accessed with the same device, then the device may be allowed to link the insurance information from each drivers identity to the other driver's identity.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:

1. A system comprising:
an identity server, comprising:
   a processor;
   a communication interface coupled with the processor and facilitating machine-to-machine communications; and
   a computer-readable storage medium coupled with the processor, wherein the computer-readable storage medium comprises instructions that, when executed by the processor, enable the processor to:
      receive information from an identity document that is asserted to prove an identity of an entity;
      verify a format of the identity document matches, within a predetermined statistical probability, an expected format of the identity document;
      in response to verifying the format of the identity document matches the expected format of the identity document, extract at least some information from the identity document;
      determine that an additional identity document is required to build an electronic record that represents the identity of the entity; and
      provide a request to the entity for the additional identity document;
      build an electronic record that represents the identity of the entity, wherein the electronic record includes the extracted at least some information; and
      store the electronic record in a database, wherein the electronic record is stored in the database in such a way as to enable the entity to assert information from the electronic record to an untrusted entity for verification of the identity of the entity.

2. The system of claim 1, wherein the instructions further enable the processor to:
receive information from the additional identity document that is asserted to further prove the identity of the entity;

verify a format of the additional identity document matches, within the predetermined statistical probability, an expected format of the additional identity document;

in response to verifying the format of the additional identity document matches the expected format of the additional identity document, extract at least some information from the additional identity document; and include the extracted at least some information from the additional identity document in the electronic record in the database.

3. The system of claim 1, wherein the instructions further enable the processor to:

determine that a minimum number of identity documents have not been received; and condition the building and storing of the electronic record that represents the identity of the entity in the database upon the entity providing a number of identity documents that meet the minimum number of identity documents.

4. The system of claim 1, wherein:

the database corresponds to a distributed database;

the electronic record is stored as an entry in a distributed ledger; and the electronic record comprises at least one validation signature and at least one reference to another entry in the distributed ledger.

5. The system of claim 1, wherein the instructions further enable the processor to:

receive a request for identity verification of the entity;

determine, from the request, that at least some information from the electronic record will be shared with the untrusted entity as part of the untrusted entity verifying the identity of the entity;

reference the database to retrieve the at least some information from the electronic record that will be shared with the untrusted entity; and transmit an electronic message over a communication network to a device operated by the untrusted entity, wherein the electronic message contains the at least some information retrieved from the electronic record.

6. The system of claim 1, wherein the instructions further enable the processor to:

receive a request for an attestation of information stored in the electronic record;

receive an attestation for the information stored in the electronic record; and store the attestation as part of or with reference to the electronic record, thereby causing the attestation to become part of the identity of the entity in the database.

7. The system of claim 6, wherein the attestation is received from an attesting entity different from the entity, wherein the attesting entity maintains a record correlating to the entity.

8. The system of claim 7, wherein the attesting entity is at least one of a school at which the entity attended or a place of employment of the entity.

9. The system of claim 1, wherein the entity comprises an individual person.

10. The system of claim 1, wherein the identity document comprises at least one of a government-issued physical document and a government-issued electronic document.

11. The system of claim 1, wherein the format of the identity document is verified by scanning the identity document for a security feature.

12. The system of claim 9, wherein the extracted at least some information comprises a photograph of the entity and textual content that describes the entity.

13. The system of claim 12, wherein the textual content comprises a name of the entity and a date of birth of the entity.

14. A method comprising:

receiving information from an identity document that is asserted to prove an identity of an entity;

verifying a format of the identity document matches, within a predetermined statistical probability, an expected format of the identity document;

in response to verifying the format of the identity document matches the expected format of the identity document, extracting at least some information from the identity document;

building an electronic record that represents the identity of the entity, wherein the electronic record includes the extracted at least some information;

receiving one or more additional information inputs asserting to prove the identity of the entity, and upon determining that a minimum number of the one or more additional information inputs are verified, augmenting the electronic record based on at least the verified one or more additional information inputs to generate an augmented electronic record that represents the identify of the entity; and storing the augmented electronic record in a database, wherein the augmented electronic record is stored in the database in such a way as to enable the entity to assert information from the augmented electronic record to an untrusted entity for verification of the identity of the entity.

15. The method of claim 14, further comprising:

determining that an additional identity document is required to build the electronic record that represents the identity of the entity;

providing a request to the entity for an additional identity document;

receiving information from the additional identity document that is asserted to further prove the identity of the entity;

verifying a format of the additional identity document matches, within the predetermined statistical probability, an expected format of the additional identity document;

in response to verifying the format of the additional identity document matches the expected format of the additional identity document, extracting at least some information from the additional identity document; and including the extracted at least some information from the additional identity document in the augmented electronic record that represents the identity of the entity in the database.

16. The method of claim 15, wherein the additional identity document comprises a physical document and wherein the identity document comprises an electronic document.

17. The method of claim 14, further comprising:

storing device-agnostic identity access credentials for the entity such that the device-agnostic identity access credentials refer to the augmented electronic record that represents the identity of the entity in the database;

receiving a request from an unrecognized device to access the augmented electronic record that represents the identity of the entity in the database; and requesting information from a user of the unrecognized device prior to allowing the unrecognized device to access the augmented electronic record that represents the identity of the entity in the database.

18. The method of claim 17, wherein the information requested from the user includes an image of the user and additional information, the method further comprising:
receiving a recently-captured image of the user from the unrecognized device;
comparing the recently-captured image of the user with a stored image of the entity; and
conditioning access to the augmented electronic record upon the recently-captured image matching the stored image of the entity within a predetermined threshold.

19. The method of claim 18, wherein the additional information comprises a passphrase that is compared with a stored passphrase created by the entity.

20. An identity server comprising:
a processor;
a communication interface coupled with the processor and facilitating machine-to-machine communications; and
a computer-readable storage medium coupled with the processor, wherein the computer-readable storage medium comprises instructions that, when executed by the processor, enable the processor to:
receive information from an identity document that is asserted to prove an identity of an entity;
verify a format of the identity document matches, within a predetermined statistical probability, an expected format of the identity document;
in response to verifying the format of the identity document matches the expected format of the identity document:
extract at least some information from the identity document;
build an electronic record that represents the identity of the entity, wherein the electronic record includes the extracted at least some information; and
store the electronic record that represents the identity of the entity in a database, wherein the electronic record that represents the identity of the entity is stored in the database in such a way as to enable the entity to assert information from the electronic record to an untrusted entity for verification of the identity of the entity; and
in response to determining the format of the identity document does not match the expected format of the identity document, discard the information from the identity document, such that an electronic record that represents the identity of the entity based on the information from the identity document is not stored in the database.

* * * * *